United States Patent
Matsuki et al.

(10) Patent No.: US 10,539,801 B2
(45) Date of Patent: Jan. 21, 2020

(54) DISPLAY DEVICE

(71) Applicant: SEIKO EPSON CORPORATION, Tokyo (JP)

(72) Inventors: Hayato Matsuki, Suwa (JP); Takashi Takeda, Suwa (JP); Shohei Yoshida, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/242,552

(22) Filed: Jan. 8, 2019

(65) Prior Publication Data

US 2019/0212562 A1 Jul. 11, 2019

(30) Foreign Application Priority Data

Jan. 9, 2018 (JP) .................. 2018-001024

(51) Int. Cl.
*G02B 27/01* (2006.01)
*F21V 8/00* (2006.01)

(52) U.S. Cl.
CPC ......... *G02B 27/0172* (2013.01); *G02B 6/002* (2013.01); *G02B 6/0055* (2013.01); *G02B 2027/0118* (2013.01)

(58) Field of Classification Search
None
See application file for complete search history.

(56) References Cited

U.S. PATENT DOCUMENTS

| | | |
|---|---|---|
| 2003/0165017 A1 | 9/2003 | Amitai |
| 2007/0008624 A1 | 1/2007 | Hirayama |
| 2008/0186604 A1 | 8/2008 | Amitai |
| 2017/0219830 A1 | 8/2017 | Komatsu et al. |
| 2017/0255014 A1 | 9/2017 | Komatsu et al. |

FOREIGN PATENT DOCUMENTS

| | | |
|---|---|---|
| JP | 2008-533507 A | 8/2008 |
| JP | 2013-210633 A | 10/2013 |
| JP | 2016-042136 A | 3/2016 |
| JP | 2017-161563 A | 9/2017 |
| JP | 2017-161564 A | 9/2017 |
| WO | 2005/088384 A1 | 9/2005 |

*Primary Examiner* — Jerry Rahll
(74) *Attorney, Agent, or Firm* — Oliff PLC

(57) ABSTRACT

A display device of the invention includes: an image generation part configured to generate image light; a light guide being configured to guide the image light; and an emitting part configured to cause the image light to emit from the light guide toward an exit pupil, in which the emitting part includes a plurality of half mirrors which are disposed parallel to one another at an interval, each of the plurality of half mirrors being configured to reflect a part of the image light and cause another part of the image light to pass through the half mirror, and in at least one half mirror of the plurality of half mirrors, when Bmax represents a maximum luminance, Bmin represents a minimum luminance, and a luminance ratio R (%) is defined as R=[(Bmax−Bmin)/Bmax]×100, R≤30 is satisfied.

13 Claims, 22 Drawing Sheets

DISPLAY DEVICE

BACKGROUND

1. Technical Field

The invention relates to a display device.

2. Related Art

In recent years, image display devices, such as a head mounted display, which are mounted on a viewer's head have been provided as a wearable information device.

For example, WO 2005/088384 discloses an image display device including an optical deflection system with a plurality of half mirrors which reflect image light toward the exit pupil. WO 2005/088384 describes that a part of a first reflection transmission surface casts a shadow on a second reflection transmission surface adjacent to the first reflection transmission surface and the shadow causes a cyclic luminance unevenness. By disposing the reflection transmission surfaces at high density, the above-mentioned luminance unevenness can be avoided and an uncomfortable feeling of the viewer can be substantially eliminated.

WO 2005/088384 describes luminance unevenness due to two reflection transmission surfaces which are overlapped with each other as viewed from the viewer. However, factors other than the above-mentioned factor also cause luminance unevenness, and contrasted streaks are visually recognized by the eyes of the viewer, resulting in degradation in image quality.

SUMMARY

An object of one aspect of the invention is to provide a display device which can suppress a contrasted streak from being visually recognized by eyes of a viewer to solve the above-mentioned problem.

To achieve the above-mentioned object, a display device of one aspect of the invention includes an image generation part configured to generate image light, a light guide including a first surface and a second surface opposite to each other, the light guide being configured to guide the image light, an incidence part configured to cause the image light to enter the light guide from the image generation part, and an emitting part configured to cause the image light to emit from the light guide toward an exit pupil, wherein the emitting part includes a plurality of half mirrors which are disposed parallel to one another at an interval, each of the plurality of half mirrors being tilted to the first surface and the second surface and configured to reflect a part of the image light and cause another part of the image light to pass through the half mirror, and in at least one half mirror of the plurality of half mirrors, when Bmax represents a maximum luminance, Bmin represents a minimum luminance, and a luminance ratio R (%) is defined as $R=[(Bmax-Bmin)/Bmax] \times 100$, $R \leq 30$ is satisfied.

The inventor paid attention to an issue of a contrasted streak visually recognized by the eyes of the viewer due to luminance unevenness which is caused in one half mirror, not a contrasted streak due to overlap of half mirrors adjacent to each other, and studied a solution of the issue.

In a display device according to one aspect of the invention, the luminance ratio of at least one of a plurality of half mirrors is equal to or lower than 30%, and thus a contrasted streak visually recognized by the eyes of the viewer can be reduced regardless of whether half mirrors adjacent to each other overlap with each other. The reason why a contrasted streak is less visually recognized in a case where the luminance ratio in one half mirror is equal to or lower than 30% is described later in detail.

In a display device according to one aspect of the invention, the at least one half mirror includes a reflectance equal to or lower than 30% at an incident angle at which the image light may be selectively reflected, and a transmittance higher than 70% at an incident angle at which the image light may be selectively allowed to pass through the at least one half mirror.

With this configuration, by setting the reflectance and the transmittance of the half mirror in the above-mentioned manner, the luminance ratio in one half mirror can be adjusted to 30% or lower.

In a display device according to one aspect of the invention, the luminance ratio R (%) may be $R \leq 10$.

With this configuration, the luminance ratio of at least one of the plurality of half mirrors is equal to or lower than 10%, and thus a contrasted streak visually recognized by the eyes of the viewer can be sufficiently suppressed regardless of whether half mirrors adjacent to each other overlap with each other.

In a display device according to one aspect of the invention, the at least one half mirror includes a reflectance equal to or lower than 10% at an incident angle at which the image light may be selectively reflected, and a transmittance higher than 90% at an incident angle at which the image light may be selectively allowed to pass through the at least one half mirror.

With this configuration, by setting the reflectance and the transmittance of the half mirror in the above-mentioned manner, the luminance ratio in one half mirror can be adjusted to 10% or lower.

In a display device according to one aspect of the invention, each of the plurality of half mirrors may be composed of a dielectric multi-layer film.

With this configuration, the reflectance, transmittance and other characteristics of the half mirror can be controlled by appropriately adjusting the configuration of dielectric multi-layer film, more specifically, the type of the dielectric, the film thickness, the number of layers, and the like.

In a display device according to one aspect of the invention, a metal film may be provided inside the dielectric multi-layer film.

With this configuration, the dispersion of the reflectance due to the wavelength in the dielectric multi-layer film can be suppressed, and accordingly color unevenness in the image can be reduced.

In a display device according to one aspect of the invention, of the plurality of half mirrors, a pitch between a first half mirror and a half mirror adjacent to the first half mirror may be smaller than a pitch between a second half mirror and a half mirror adjacent to the second half mirror, the second half mirror being located on a side further from the image generation part than the first half mirror.

With this configuration, the luminance difference due to the gap and/or overlap of the half mirrors adjacent to each other can be reduced, and accordingly degradation in image quality can be suppressed.

In a display device according to one aspect of the invention, at least one half mirror of the plurality of half mirrors may have a width different from a width of another half mirror.

With this configuration, the luminance difference due to the gap and/or overlap of the half mirrors adjacent to each other can be reduced, and accordingly degradation in image quality can be suppressed.

In a display device according to one aspect of the invention, at least one half mirror of the plurality of half mirrors may include a first region and a second region with film thickness different from a film thickness of the first region.

With this configuration, the first region and the second region may have reflectances different from each other. As a result, the luminance difference in one half mirror can be further reduced in comparison with a case that the reflectance in one half mirror is constant.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

First Exemplary Embodiment of the invention is described below with reference to FIG. 1 to FIG. 11.

A display device according to the present embodiment is used as a head mounted display configured to be mounted on a viewer's head, for example.

Figure 1:
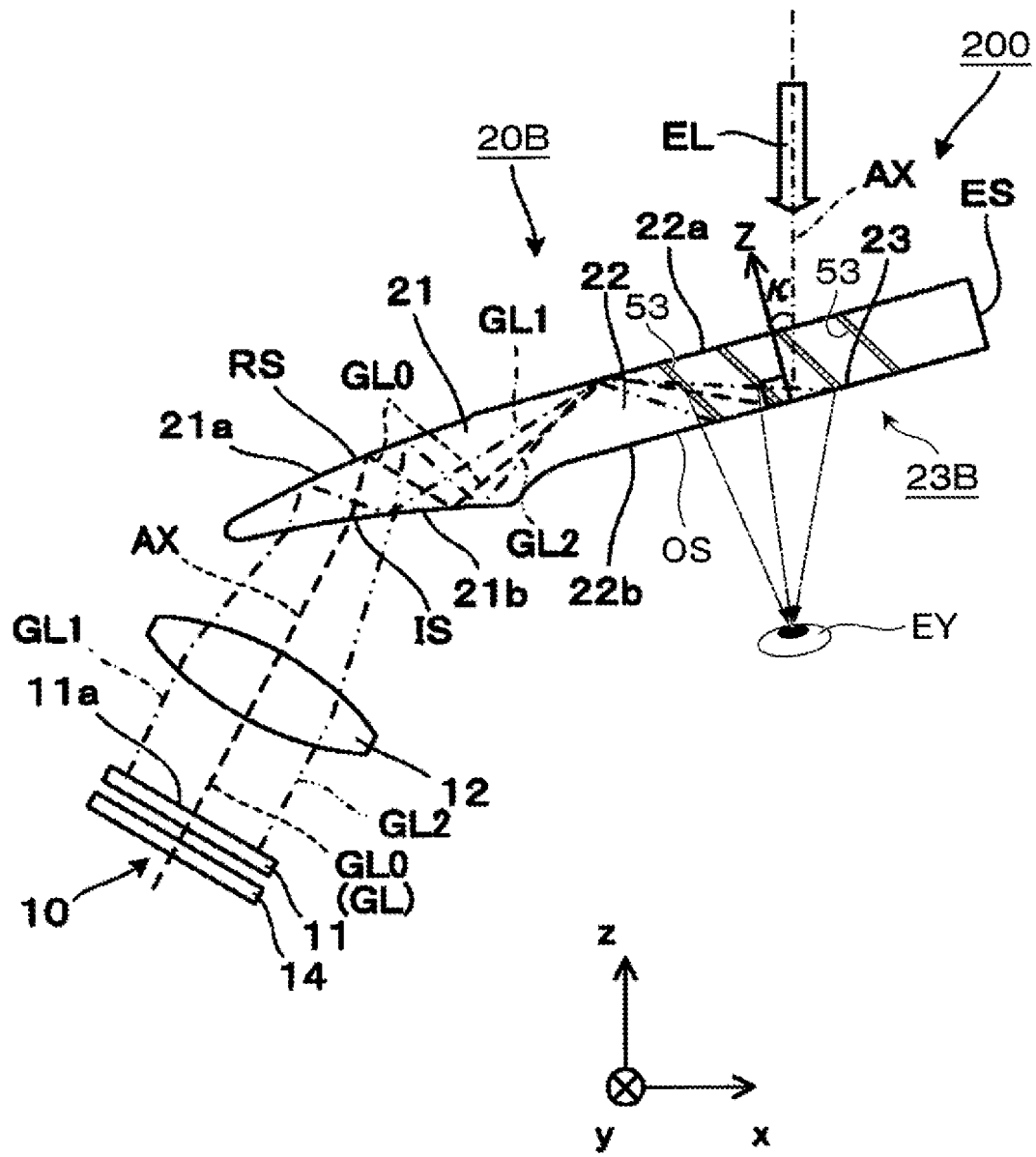
FIG. 1 is a plan view of a display device according to First Exemplary Embodiment.

FIG. 1 is a plan view of the display device according to the present embodiment.

Note that, in the drawings, the dimensions of some components may be scaled differently for ease of understanding for the components.

As illustrated in FIG. 1, a display device 200 includes an image generation part 10, and a light guiding member 20B.

The display device 200 is configured to allow a viewer to visually recognize an image generated by the image generation part 10 as a virtual image, and allow the viewer to view the outside image in a see-through manner. The display device 200 includes a pair of the image generation part 10 and the light guiding member 20B for each of the right and left eyes of the viewer. The device for the right eye and the device for the left eye have the same configuration except that the devices are configured symmetric laterally. Therefore, only the portions for the left eye are illustrated and the portions for the right eye are omitted here. The display device 200 has an eyeglasses-like external appearance as a whole, for example.

The image generation part 10 includes a liquid crystal panel 11, a projection lens 12, and a light source 14. The liquid crystal panel 11 is configured to spatially modulate illumination light from the light source 14 to generate image light GL which serves as a moving image, and other display objects. Note that, not limited to the liquid crystal panel 11, an organic electroluminescence (EL) element and the like may be used for the image generation part 10.

The projection lens 12 is a collimator lens configured to substantially collimate image light GL0, GL1 and GL2 emitted from respective points on the liquid crystal panel 11. The projection lens 12 is formed of glass or a plastic. The projection lens 12 may be composed of multiple lenses, not limited to one lens. The projection lens 12 may be an aspherical lens, a free-curve lens or the like, not limited to a sphere lens.

The light guiding member 20B is composed of an optically transparent member having a plate shape. The light guiding member 20B is configured to guide the image light GL generated by the image generation part 10 and then emit the image light GL to a viewer's eye EY while causing external light EL forming an outside image to pass through the light guiding member 20B. The light guiding member 20B includes an incidence part 21 configured to receive the image light, a light guide 22 configured to mainly guide the image light, and an emitting part 23B configured to output the image light GL and the external light EL. The light guiding member 20B is obtained by joining together the incidence part 21, which is produced by resin molding, and the light guide 22, which includes the emitting part 23B and is produced by cutting out of a laminated glass plate. In the present embodiment, an optical path of the image light GL travelling through the light guiding member 20B is an optical path of one type with the same number of reflection times, and is not a combination of optical paths of multiple types.

The light guide 22 is tilted to an optical axis AX set with reference to the line of sight of the viewer's eye EY facing front. A normal direction Z of a plane surface 22a of the light guide 22 is tilted to the optical axis AX by an angle K. This configuration allows the light guide 22 to be disposed along the front surface of the face, and the normal line to the plane surface 22a of the light guide 22 is tilted to the optical axis AX. With the configuration in which the normal line to the plane surface 22a of the light guide 22 is tilted by the angle K to the z direction which is parallel to the optical axis AX, the image light GL0, emitted from an optical element 30, on the optical axis AX and in a region near the optical axis AX is at the angle K with respect to a normal line to a light emission surface OS. Here, the light guide 22 may be disposed perpendicular to the optical axis AX.

In the following description, the direction parallel to the optical axis AX is referred to as the z direction, the horizontal direction in the plane perpendicular to the z direction is referred to as the x direction, and the vertical direction in the plane perpendicular to the z direction is referred to as the y direction.

The incidence part 21 includes a light incidence surface IS and a reflection surface RS. The image light GL emitted from the image generation part 10 enters the incidence part 21 through the light incidence surface IS. The image light GL having entered the incidence part 21 is reflected by the reflection surface RS and guided to the inside of the light guide 22. The light incidence surface IS is formed of a curved surface 21b having a recessed shape as viewed from the projection lens 12. The curved surface 21b also has a function of totally reflecting, on the inner surface side, the image light GL reflected by the reflection surface RS.

The reflection surface RS is formed of a curved surface 21a having a recessed shape as viewed from the projection lens 12. The reflection surface RS is composed of a metal film, such as an aluminum film, which is formed by an evaporation method or the like on the curved surface 21a. The reflection surface RS is configured to reflect incident image light GL from the light incidence surface IS to bend the optical path. The curved surface 21b is configured, at the inside, to totally reflect the image light GL reflected by the reflection surface RS to bend the optical path. In this manner, the incidence part 21 is configured to reflect the incident image light GL from the light incidence surface IS twice to bend the optical path, and thus surely guide the image light GL to the inside of the light guide 22.

The light guide 22 is composed of a plate-shaped member which is parallel to the y axis and is tilted to the z axis. The light guide 22 is formed in a plate shape with an optically transparent resin material or the like, and includes a pair of the plane surfaces 22a and 22b substantially parallel to each other. The plane surfaces 22a and 22b form a pair of parallel surfaces, and thus magnification of the outside image and defocusing are hardly caused. The plane surface 22a functions as a total reflection surface which totally reflects image light from the incidence part 21, and guides, to the emitting part 23, the image light GL with minimum loss. The plane surface 22a is located on the external side of the light guide 22 and functions as a first total reflection surface, which is also referred to as an external side surface herein. The plane surface 22b is also referred to as a viewer side surface herein.

In the light guide 22, the image light GL reflected by the reflection surface RS or the light incidence surface IS of the incidence part 21 hits the plane surface 22a, which is the total reflection surface, and is totally reflected by the plane surface 22a, and is then, guided toward the depth side of the light guide device 20, that is, the +x side where the emitting part 23 is provided.

The emitting part 23B emits the image light GL from the light guide 22 toward the exit pupil. The emitting part 23B includes a plurality of half mirrors 53 which are provided parallel to one another at an interval and each of the plurality of half mirrors is configured to reflect a part of the image light GL and cause another part of the image light GL to pass through the half mirror. Inside the light guide 22, the plurality of half mirrors 53 are tilted to the plane surface 22a and the plane surface 22b. The configuration of the plurality of half mirrors 53 is described later.

When allowing the image light GL totally reflected in a region RS of an external side plane surface (total reflection surface) 22a of the light guide 22 to pass through the emitting part 23B, the emitting part 23B reflects, at a predetermined angle, the image light GL incident on the half mirrors 53 to bend the optical path of the image light GL toward the exit pupil. The image light GL emitted from the plane surface 22b enters the viewer's eye EY as virtual image light. The virtual image light forms an image on the retina of the viewer, and thus the viewer can visually recognize a virtual image of the image light GL.

Each of the plurality of half mirrors 53 is composed of a dielectric multi-layer film including a metal film made of silver, for example. That is, a metal film is provided inside the dielectric multi-layer film of each half mirror 53. Each of the plurality of half mirrors 53 is set such that the luminance ratio in the plane of one half mirror 53 of emission light emitted toward the exit pupil is equal to or lower than 30%. In each half mirror 53, the reflectance at the incident angle at which the image light GL is selectively reflected is equal to or lower than 30%, and the transmittance at the incident angle at which the image light GL is selectively allowed to pass through the half mirror 53 is higher than 70%.

More preferably, each of the plurality of half mirrors 53 is set such that the luminance ratio in the plane of one half mirror 53 of emission light emitted toward the exit pupil is equal to or lower than 10%. In this case, in each half mirror 53, the reflectance at the incident angle at which the image light GL is selectively reflected is equal to or lower than 10%, and the transmittance at the incident angle at which the image light GL is selectively allowed to pass through the half mirror 53 is higher than 90%.

According to the present embodiment, the half mirror 53 is composed of a dielectric multi-layer film, and thus the characteristics of the half mirror 53, such as the reflectance and the transmittance, can be controlled by appropriately adjusting the configuration of the dielectric multi-layer film, more specifically, the type of the dielectric, film thickness, the number of layers and the like. Further, the metal film is provided inside the dielectric multi-layer film, and thus the dispersion of the reflectance due to the wavelength in the dielectric multi-layer film can be suppressed, and color unevenness in the image can be reduced.

When Bmax represents the maximum luminance of emission light from one half mirror 53 and Bmin represents the minimum luminance of emission light from one half mirror 53, the luminance ratio R (%) in the plane of one half mirror 53 is expressed as Equation (1) below.

$$R(\%)=[(Bmax-Bmin)/Bmax]\times 100 \quad (1)$$

Half mirrors used as the half mirrors 53 include a half mirror configured to selectively cause light whose incident angle to the half mirror is relatively small to pass the half mirror and selectively reflect light whose incident angle is relatively large, and a half mirror configured to selectively reflect light whose incident angle to the half mirror is relatively small and selectively cause light whose incident angle is relatively large to pass through the half mirror.

First, the former half mirror is discussed.

Example 1: Luminance Ratio in One Half Mirror

As Example 1, a case is assumed in which a light guiding member in which the inclination angle of the half mirror with respect to the plane of the light guide is set to 60° is used, and that light is incident on the half mirror at an incident angle of 60°. It is assumed that the half mirrors have characteristics in which the transmittance of light whose incident angle is relatively small is 98%, and the reflectance of light whose incident angle is relatively large is 23%.

Figure 2:
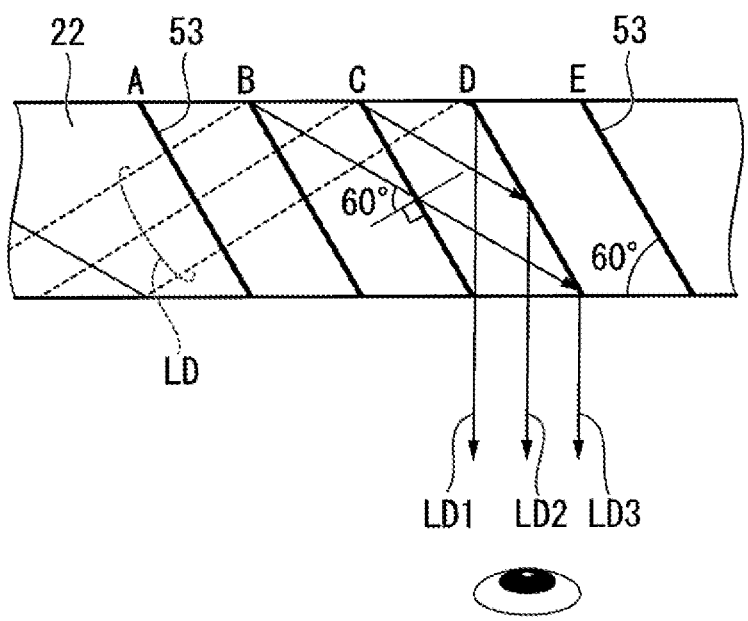
FIG. 2 is a schematic view illustrating light reflection in one half mirror in a display device according to Example 1.

FIG. 2 is a schematic view illustrating light reflection in one half mirror 53. FIG. 2 illustrates five half mirrors 53 at different positions A to E from each other on the light guide 22, and illustrates a reflection of light emitted from the half mirror 53 at position D.

As illustrated in FIG. 2, light LD1 passes through the half mirrors 53 of position A, position B, and position C, is reflected by the half mirror 53 of position D, and then is emitted out from the light guide 22. That is, the emission light LD1 passes through the mirrors three times and is reflected by the mirror one time before being emitted from the light guide 22. In this case, when the luminance of the incident light, that is, the luminance of light LD prior to incidence on the half mirror 53 of position A, is represented by 100, the luminance of the emission light LD1 is 100× 0.98×0.98×0.98×0.23=21.6.

Likewise, emission light LD2 is emitted from the light guide 22 after passing through the half mirrors 53 of position A and position B and being reflected by the half mirrors 53 of position C and position D. That is, the emission light LD2 passes through the mirrors two times and is reflected by the mirrors two times before being emitted from the light guide 22. In this case, when the luminance of the incident light is represented by 100, the luminance of the emission light LD2 is 100×0.98×0.98×(1−0.23)×0.23=17.

Likewise, emission light LD3 is emitted from the light guide 22 after passing through the half mirror 53 of position A and being reflected by the half mirrors 53 of position B, position C, and position D. That is, the emission light LD3 passes through the mirror one time and is reflected by the mirrors three times before being emitted from the light guide 22. In this case, when the luminance of the incident light is represented by 100, the luminance of the emission light LD3 is 100×0.98×(1−0.23)×(1−0.23)×0.23=13.4.

Table 1 provides a summary of results of the above calculations.

TABLE 1

| | Number of transmissions (T: 98%) | Number of reflections (R: 23%) | Luminance |
|---|---|---|---|
| LD1 | 3 | 1 | 21.6 |
| LD2 | 2 | 2 | 17 |
| LD3 | 1 | 3 | 13.4 |

In Table 1, the maximum luminance Bmax of the emission light from the half mirror 53 is 21.6, and the minimum luminance Bmin of the emission light is 13.4, and therefore, in accordance with Equation (1), the luminance ratio R (%) is 38%.

Next, Table 2 provides a summary of results of the above-mentioned calculations in which the reflectance of the half mirrors 53 in FIG. 2 is changed from 23% to 10%.

TABLE 2

|  | Number of transmissions (T: 98%) | Number of reflections (R: 10%) | Luminance |
|---|---|---|---|
| LD1 | 3 | 1 | 9.4 |
| LD2 | 2 | 2 | 8.6 |
| LD3 | 1 | 3 | 7.9 |

In Table 2, the maximum luminance Bmax of the emission light from the half mirror 53 is 9.4, and the minimum luminance Bmin of the emission light is 7.9, and therefore, in accordance with Equation (1), the luminance ratio R (%) is 16%.

As described above, regarding the emission lights (reflection lights) at the same angle from the half mirror 53 of position D, when the luminance (intensity) of light which reaches the exit pupil after multiple times of transmissions or reflections is calculated, the luminance decreases from the emission light LD1 to the emission light LD3. When the reflectance of 23% and the reflectance of 10% are compared with each other by replacing the degree of the luminance reduction with the luminance ratio, it is understood that the lower the reflectance, the smaller the luminance ratio. This means that the in-plane luminance difference in the half mirror decreases.

As described later, when the image is visually recognized, the luminance difference is recognized as "contrasted streak" which results in image defects. The luminance difference is generated in each of the half mirrors of positions B to E while the luminance difference is not generated in the half mirror of position A, and, in a configuration in which two or more half mirrors are arranged in the above-mentioned manner, a difference between the high luminance and the low luminance is perceived by the pupil of the viewer as cyclic contrasted streaks adjacent to one another, resulting in significant degradation in image quality.

Here, the luminance ratio was calculated in the above-mentioned manner while the reflectance of the half mirrors is further changed in a unit of 10% in the range of 10 to 90%.

Figure 3:
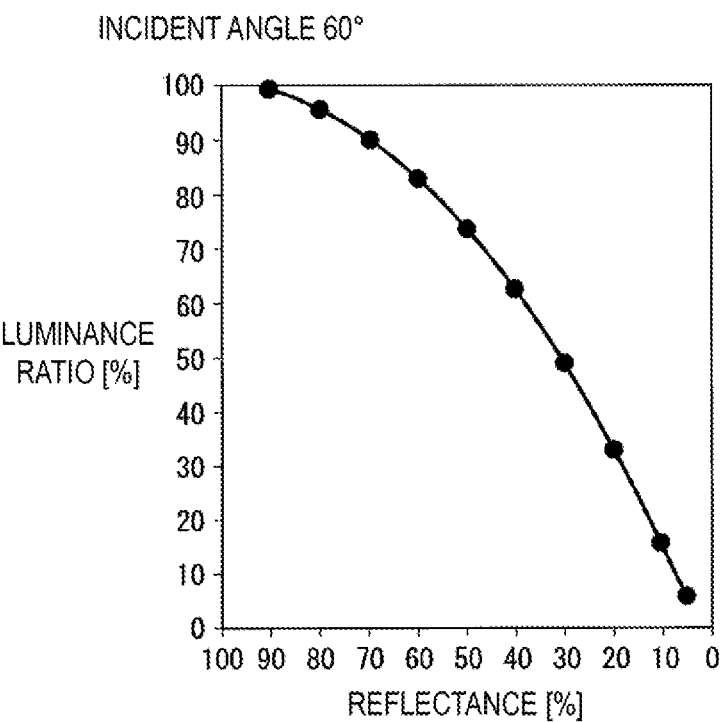
FIG. 3 is a graph illustrating a relationship between a luminance ratio and reflectance of a half mirror.

FIG. 3 is a plot of a relationship between the luminance ratio and the reflectance of the half mirror. In FIG. 3, the abscissa indicates the reflectance (%), and the ordinate indicates the luminance ratio (%).

It was confirmed from FIG. 3 that, to suppress the luminance ratio to a low value, it is preferable to reduce the reflectance of the half mirrors.

Figure 4:
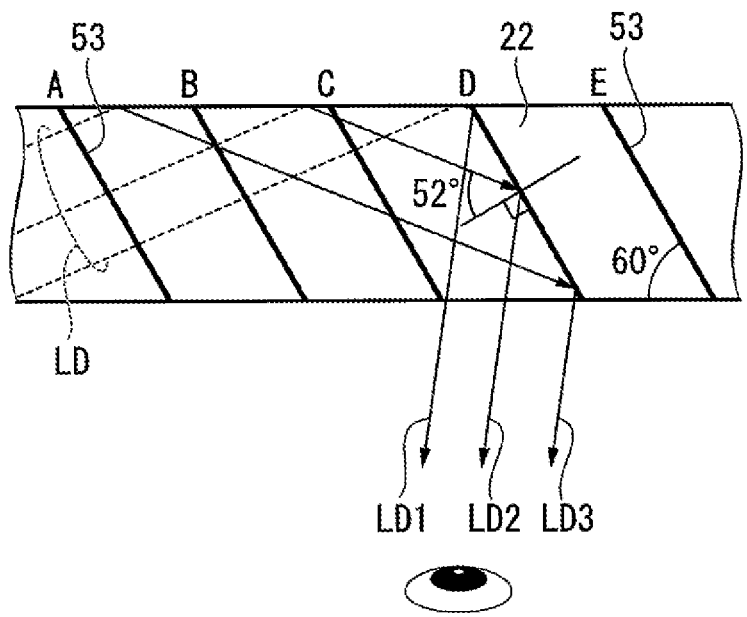
FIG. 4 is a schematic view illustrating light reflection in one half mirror.
Figure 5:
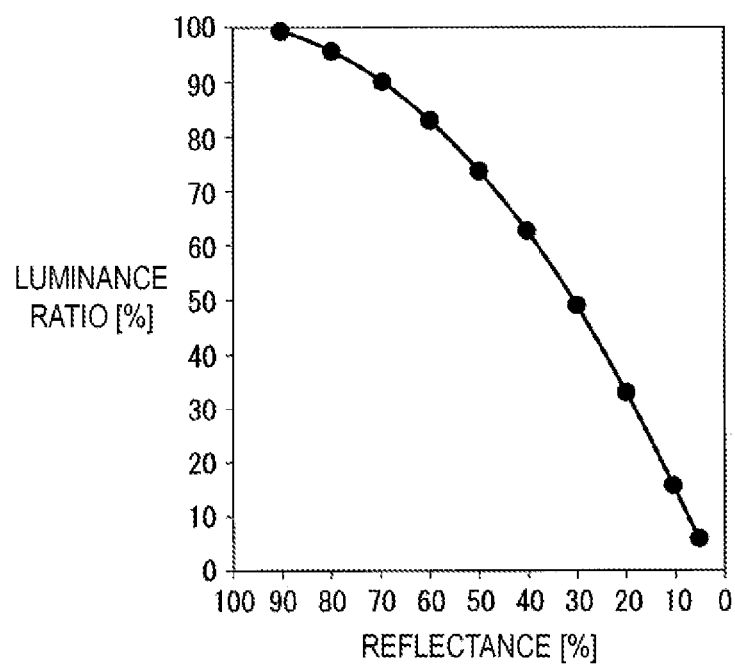
FIG. 5 is a graph illustrating a relationship between the luminance ratio and the reflectance of the half mirror.

Further, light having a field angle beam angle of about 60°±8° assuming a virtual image having an angle of view of 50 inches in an exemplary case that the material of the light guide is a common glass material and nd is 1.517 is assumed. Specifically, Table 3 and Table 4 illustrate calculated values of the luminance in a case where the incident angle to the half mirror 53 is set to 52° as illustrated in FIG. 4, instead of 60° of the above-mentioned calculation, and FIG. 5 is a plot of a relationship between the luminance ratio and the reflectance of the half mirror 53.

TABLE 3

|  | Number of transmissions (T: 98%) | Number of reflections (R: 23%) | Luminance |
|---|---|---|---|
| LD1 | 3 | 1 | 21.6 |
| LD2 | 2 | 2 | 17 |
| LD3 | 1 | 3 | 13.4 |

In Table 3, the maximum luminance Bmax of the emission light from the half mirror 53 is 21.6, and the minimum luminance Bmin of the emission light is 13.4, and therefore, in accordance with Equation (1), the luminance ratio R (%) is 38%.

TABLE 4

|  | Number of transmissions (T: 98%) | Number of reflections (R: 10%) | Luminance |
|---|---|---|---|
| LD1 | 3 | 1 | 9.4 |
| LD2 | 2 | 2 | 8.6 |
| LD3 | 1 | 3 | 7.9 |

In Table 4, the maximum luminance Bmax of the emission light from the half mirror 53 is 9.4, and the minimum luminance Bmin of the emission light is 7.9, and therefore, in accordance with Equation (1), the luminance ratio R (%) is 16%.

Figure 6:
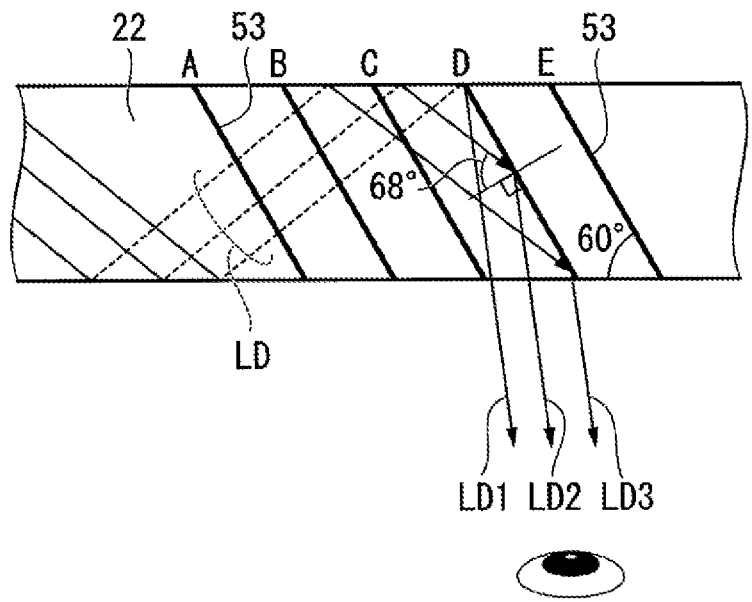
FIG. 6 is a schematic view illustrating light reflection in one half mirror.
Figure 7:
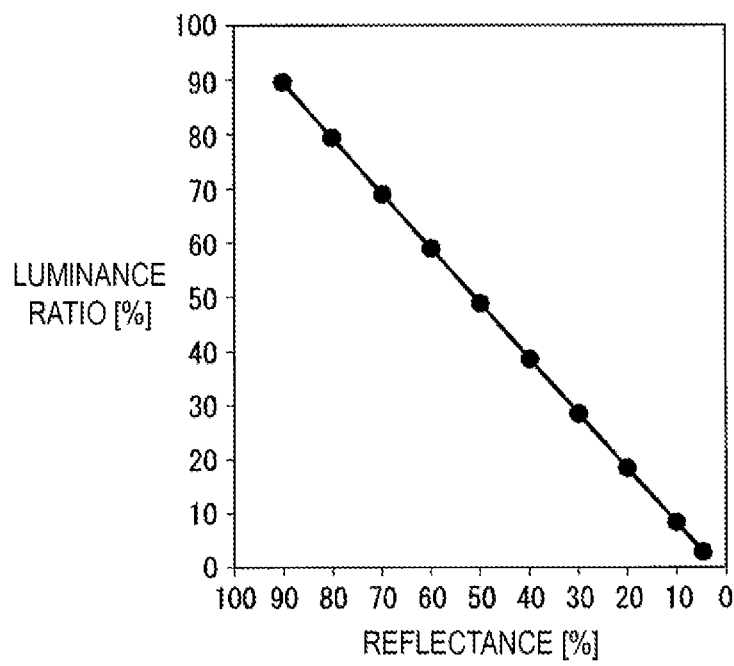
FIG. 7 is a graph illustrating a relationship between the luminance ratio and the reflectance of the half mirror.

In addition, Table 5 and Table 6 illustrate calculated values of the luminance in a case where the incident angle to the half mirror 53 is set to 68° as illustrated in FIG. 6, and FIG. 7 is a plot of a relationship between the luminance ratio and the reflectance of the half mirror 53.

TABLE 5

|  | Number of transmissions (T: 98%) | Number of reflections (R: 23%) | Luminance |
|---|---|---|---|
| LD1 | 3 | 1 | 21.6 |
| LD2 | 3 | 1 | 21.6 |
| LD3 | 2 | 2 | 17 |

In Table 5, the maximum luminance Bmax of the emission light from the half mirror 53 is 21.6, and the minimum luminance Bmin of the emission light is 17, and therefore, in accordance with Equation (1), the luminance ratio R (%) is 21.4%.

TABLE 6

|  | Number of transmissions (T: 98%) | Number of reflections (R: 10%) | Luminance |
|---|---|---|---|
| LD1 | 3 | 1 | 9.4 |
| LD2 | 3 | 1 | 9.4 |
| LD3 | 2 | 2 | 8.6 |

In Table 6, the maximum luminance Bmax of the emission light from the half mirror 53 is 9.4, and the minimum luminance Bmin of the emission light is 8.6, and therefore, in accordance with Equation (1), the luminance ratio R (%) is 8.2%.

As illustrated in FIGS. 3, 5, and 7, it was confirmed that the reflectance and the luminance ratio are substantially proportional regardless of the incident angle of the light, and the lower the reflectance, the smaller the luminance ratio. Here, the examples are based on the assumption that, regarding the plurality of half mirrors which reflect light beams of respective angles of view, no gap is present between the half mirrors adjacent to each other as viewed from the eyes of the viewer. It is also preferable to adjust the gap between the half mirrors and overlap of the half mirrors such that the luminance ratio of the entirety of the plurality of half mirrors is uniform.

Example 2: Luminance Ratio Among a Plurality of Half Mirrors

Next, the position of the half mirror which receives light changes as the position of the eyes of the viewer is horizontally moved. Therefore, assuming that the position of the eyes of the viewer horizontally moves, the luminance ratio among the plurality of half mirrors is also studied in addition to the luminance ratio in the plane of one half mirror.

As Example 2, assuming that a light guiding member in which the inclination angle of the half mirrors is set to 60° is used, and the incident angle of light to the half mirrors is set to 60°. It is assumed that the half mirrors have characteristics in which the transmittance of light whose incident angle is relatively small is 98%, and the reflectance of light whose incident angle is relatively large is 23%.

Figure 8:
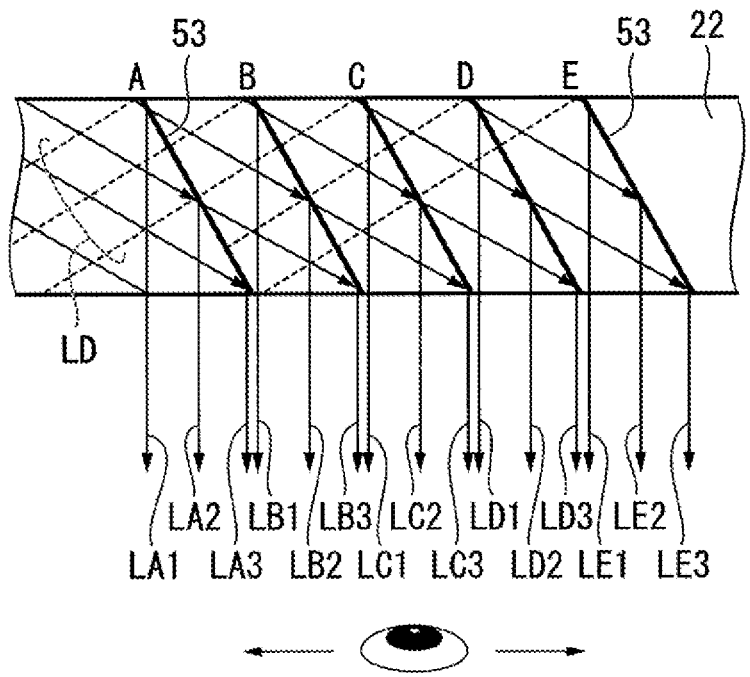
FIG. 8 is a schematic view illustrating light reflection in half mirrors of positions A to E in a display device according to Example 2.

FIG. 8 is a schematic view illustrating light reflection at five half mirrors 53 of positions A to E.

Table 7 provides a summary of calculated values of the number of transmissions/reflections, and the luminance of lights LA1 to LA3, LB1 to LB3, LC1 to LC3, LD1 to LD3, LE1 to LE3 illustrated in FIG. 8 as in Example 1.

TABLE 7

|  | Number of transmissions (T: 98%) | Number of reflections (R: 23%) | Luminance |
|---|---|---|---|
| LA1 | 0 | 1 | 23 |
| LA2 | 0 | 1 | 23 |
| LA3 | 0 | 1 | 23 |
| LB1 | 1 | 1 | 22.5 |
| LB2 | 0 | 2 | 17.7 |
| LB3 | 0 | 2 | 17.7 |
| LC1 | 2 | 1 | 22.1 |
| LC2 | 1 | 2 | 17.8 |
| LC3 | 0 | 3 | 13.6 |
| LD1 | 3 | 1 | 21.6 |
| LD2 | 2 | 2 | 17 |
| LD3 | 1 | 3 | 13.4 |
| LE1 | 3 | 2 | 16.7 |
| LE2 | 3 | 2 | 16.7 |
| LE3 | 2 | 3 | 13.1 |

Next, Table 8 provides a summary of results of the above-mentioned calculation in which the reflectance of the half mirrors is changed from 23% to 10%.

TABLE 8

|  | Number of transmissions (T: 98%) | Number of reflections (R: 10%) | Luminance |
|---|---|---|---|
| LA1 | 0 | 1 | 10 |
| LA2 | 0 | 1 | 10 |
| LA3 | 0 | 1 | 10 |
| LB1 | 1 | 1 | 9.8 |
| LB2 | 0 | 2 | 9 |
| LB3 | 0 | 2 | 9 |
| LC1 | 2 | 1 | 9.6 |
| LC2 | 1 | 2 | 9 |
| LS3 | 0 | 3 | 8.1 |
| LD1 | 3 | 1 | 9.4 |
| LD2 | 2 | 2 | 8.6 |
| LD3 | 1 | 3 | 7.9 |
| LE1 | 3 | 2 | 8.5 |
| LE2 | 3 | 2 | 8.5 |
| LE3 | 2 | 3 | 7.8 |

Here, the luminance ratio was calculated while further changing the reflectance of the half mirrors in a unit of 10% in the range from 10 to 90%.

Figure 9:
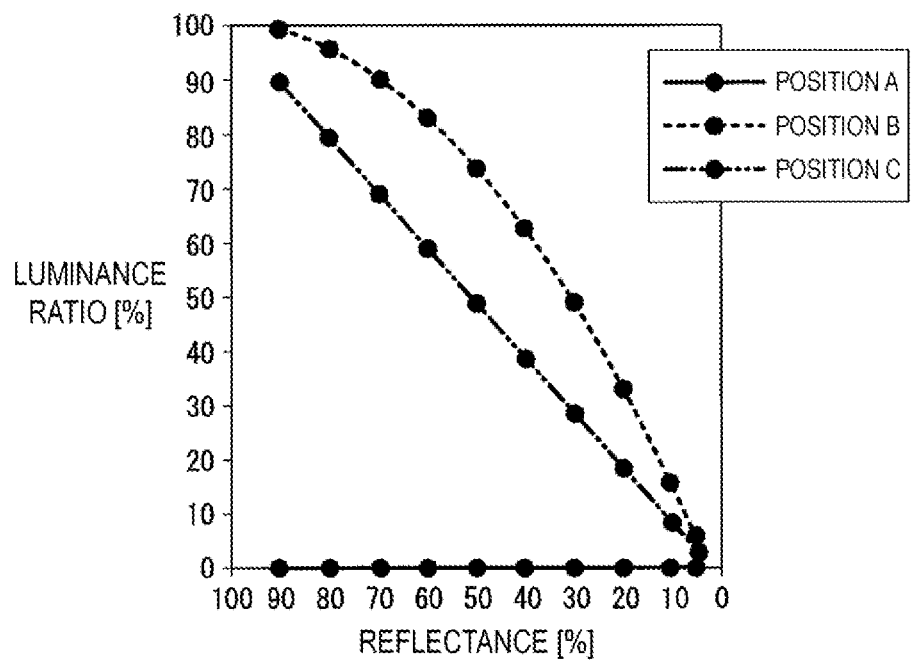
FIG. 9 is a graph illustrating a relationship between the reflectance and the luminance ratio of half mirrors of positions A to C.
Figure 10:
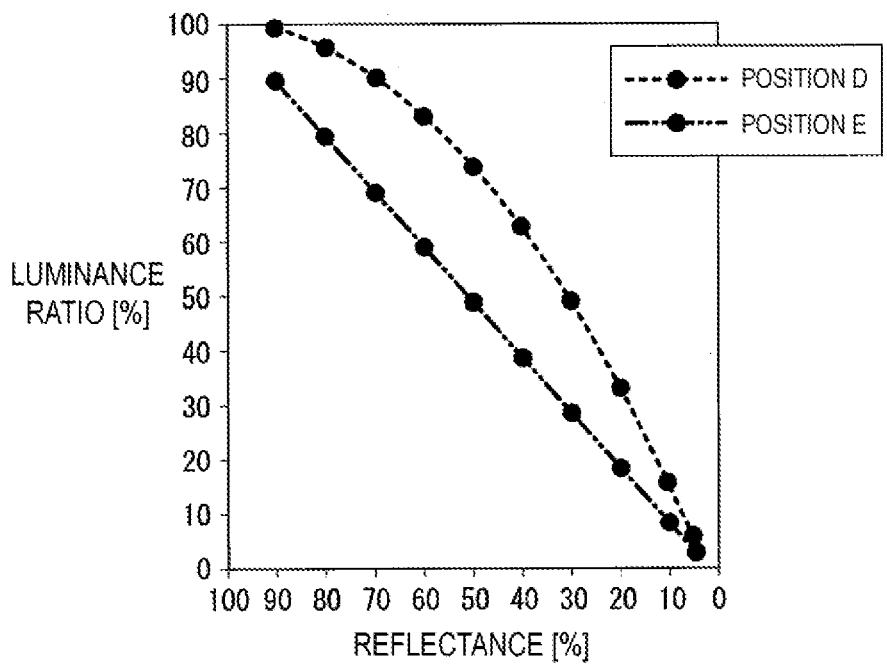
FIG. 10 is a graph illustrating a relationship between the reflectance and the luminance ratio of half mirrors of positions D and E.

FIG. 9 and FIG. 10 are plots of a relationship between the luminance ratio and the reflectance of the half mirror. In FIG. 9 and FIG. 10, the abscissa indicates the reflectance (%), and the ordinate indicates the luminance ratio (%). Note that, for ease of understanding of the graph, the graph is divided into two drawings so that FIG. 9 illustrates a plot of the half mirrors of positions A to C, and FIG. 10 illustrates a plot of the half mirrors of positions D and E.

As illustrated in FIG. 8, regarding the half mirror 53 of position A, no half mirror is present in the preceding area of the half mirror 53 of position A, and the light LD hits the half mirror 53 of position A without passing through other half mirrors. Therefore, regardless of the reflectance of the half mirror, there is no in-plane luminance difference in the half mirror, and the luminance ratio is 0 in all cases as illustrated in FIG. 9. In contrast, it was confirmed that, regarding the half mirrors 53 of positions B to E, the luminance ratio is generated in the plane of the half mirror under the influence of preceding half mirror(s), and the luminance ratio depends on the reflectance of the half mirrors. Also, it was confirmed that the luminance ratio can be reduced by suppressing the reflectance of the half mirror to a low reflectance.

Figure 11:
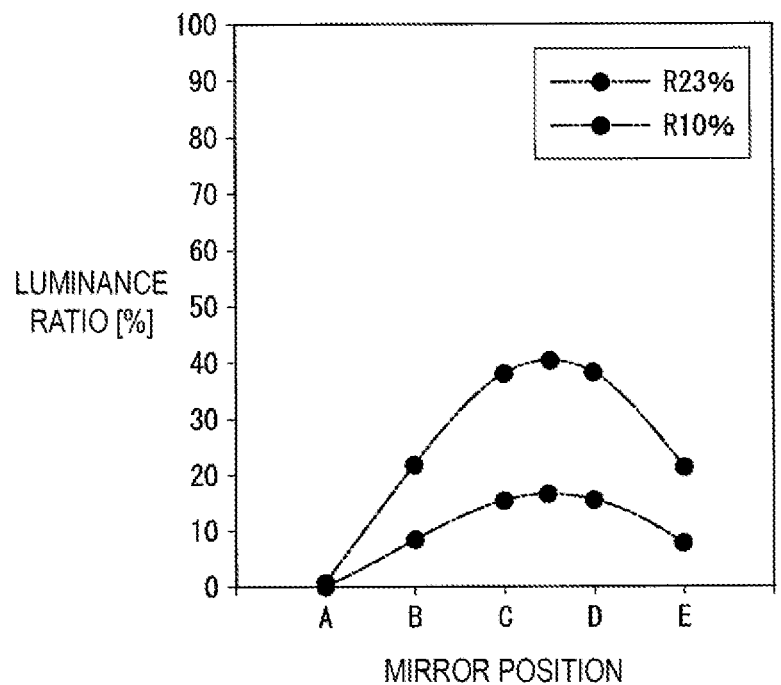
FIG. 11 is a graph illustrating a relationship between the position of the half mirror and the luminance ratio.

FIG. 11 is a graph illustrating luminance ratios of the half mirrors of positions A to E with a reflectance of 23% and a reflectance of 10%.

As illustrated in FIG. 11, it was confirmed that, also regarding the luminance ratio difference between the half mirrors which has an influence on the visibility of a contrasted streak upon horizontal movement of the eyes of the viewer, the luminance ratio difference can be reduced by suppressing the reflectance to as low as 10% in comparison with the case that the reflectance is 23%. Accordingly, it was confirmed that it is preferable to suppress the reflectance to a low value in view of the uniformity of the image luminance, and whether a contrasted streak is generated (perception of appearing and disappearing of a streak).

Next, contrary to the half mirror of Examples 1 and 2, a half mirror having characteristics in which light whose incident angle to the half mirror is relatively small is reflected and light whose incident angle is relatively large is allowed to pass through the half mirror is studied.

Example 3: Luminance Ratio in One Half Mirror

Figure 12:
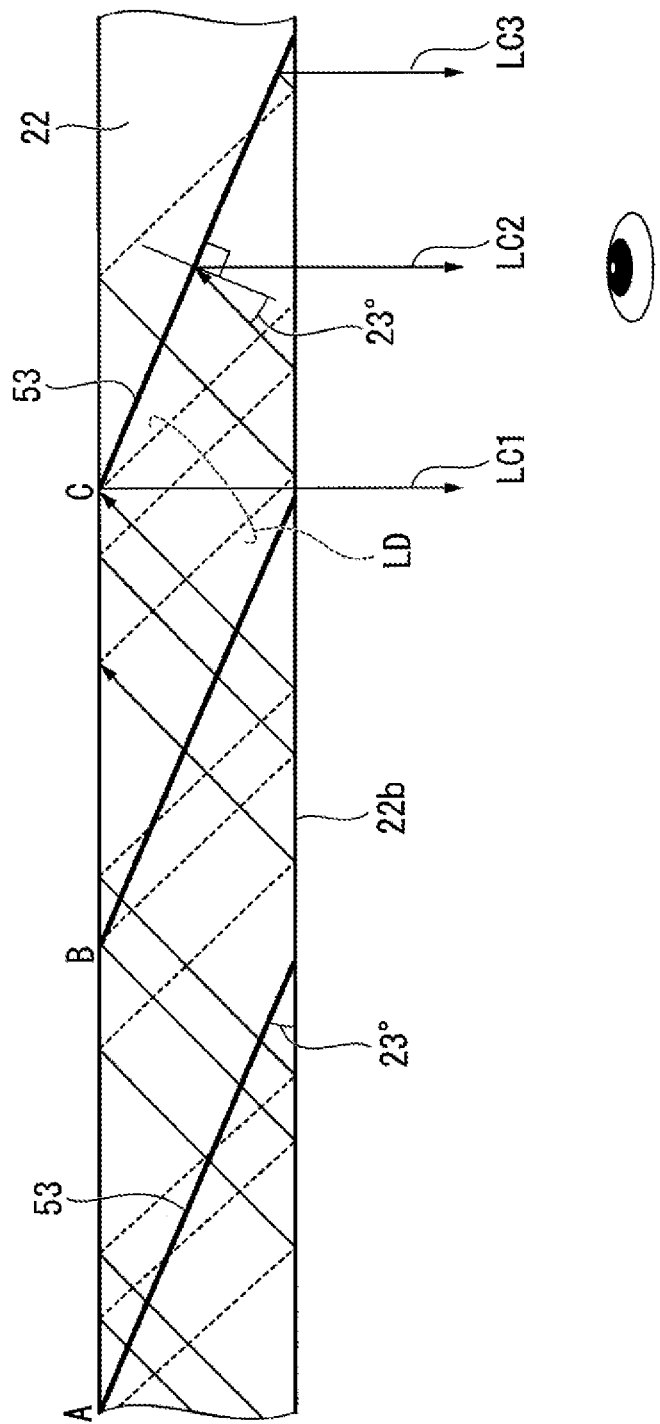
FIG. 12 is a schematic view illustrating light reflection in one half mirror in a display device according to Example 3.

As Example 3, assuming that a light guiding member in which the inclination angle of the half mirrors 53 to the plane surface 22b of the light guide 22 is set to 23° as illustrated in FIG. 12 is used, and a case that light LD hits the half mirror 53 at incident angle of 23° is studied. It is assumed that the half mirrors 53 have characteristics in which the transmittance of light whose incident angle is relatively large is 98%, and the reflectance of light whose incident angle is relatively small is 23%.

Table 9 provides a summary of calculated values of the number of transmissions/reflections and the luminance of the emission lights LC1 to LC3 illustrated in FIG. 12 as in Examples 1 and 2.

TABLE 9

|  | Number of transmissions (T: 98%) | Number of reflections (R: 23%) | Luminance |
|---|---|---|---|
| LC1 | 2 | 5 | 7.8 |
| LC2 | 2 | 5 | 7.8 |
| LC3 | 1 | 4 | 10.3 |

From Table 9, the maximum luminance Bmax of the emission light from the half mirror 53 is 10.3, and the minimum luminance Bmin of the emission light is 7.8, and therefore, in accordance with Equation (1), the luminance ratio R (%) is 24.5%.

Next, Table 10 provides a summary of results of the above-mentioned calculation in which the reflectance of the half mirrors 53 is changed from 23% to 10%.

TABLE 10

|     | Number of transmissions (T: 98%) | Number of reflections (R: 10%) | Luminance |
|-----|----------------------------------|--------------------------------|-----------|
| LC1 | 2 | 5 | 6.3 |
| LC2 | 2 | 5 | 6.3 |
| LC3 | 1 | 4 | 7.1 |

From Table 10, the maximum luminance Bmax of the emission light from the half mirror 53 is 7.1, and the minimum luminance Bmin of the emission light is 6.3, and therefore, in accordance with Equation (1), the luminance ratio R (%) is 11.8%.

Here, the luminance ratio was calculated in the above-mentioned manner while changing the reflectance of the half mirrors 53 in a unit of 10% in the range from 10 to 90%.

Figure 13:
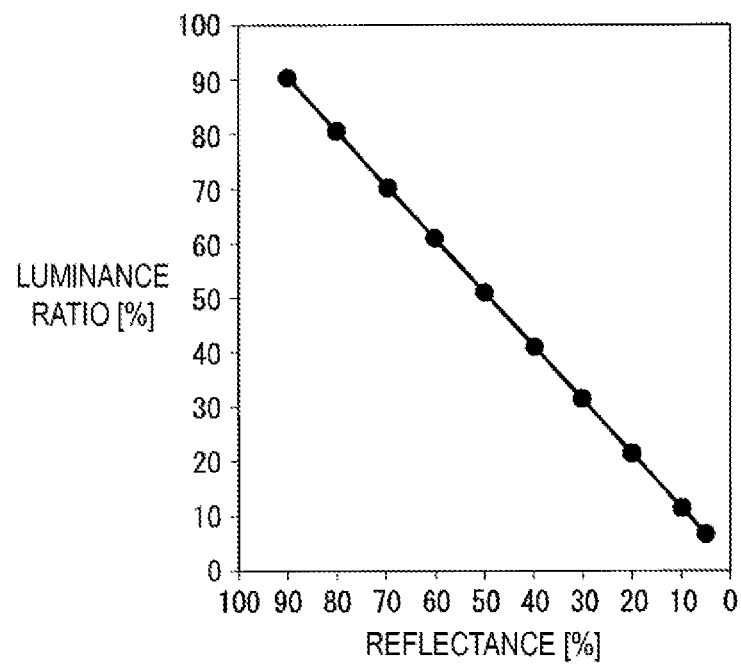
FIG. 13 is a graph illustrating a relationship between the luminance ratio and the reflectance of the half mirror.

FIG. 13 is a plot of a relationship between the luminance ratio and the reflectance of the half mirror 53. In FIG. 13, the abscissa indicates the reflectance (%), and the ordinate indicates the luminance ratio (%).

It was confirmed from FIG. 13 that, to suppress the luminance ratio to a low value, it is preferable to suppress the reflectance of the half mirrors to a low value also in a case where the half mirror having characteristics opposite to those of Examples 1 and 2 is used.

Second Exemplary Embodiment

Second Exemplary Embodiment of the invention is described below with reference to FIG. 14 and FIG. 15.

The configuration of a display device according to Second Exemplary Embodiment is substantially the same as the configuration of First Exemplary Embodiment except in the configuration of the plurality of half mirrors. Therefore, the description of the entirety of the display device is omitted, and only different portions are described.

Figure 14:
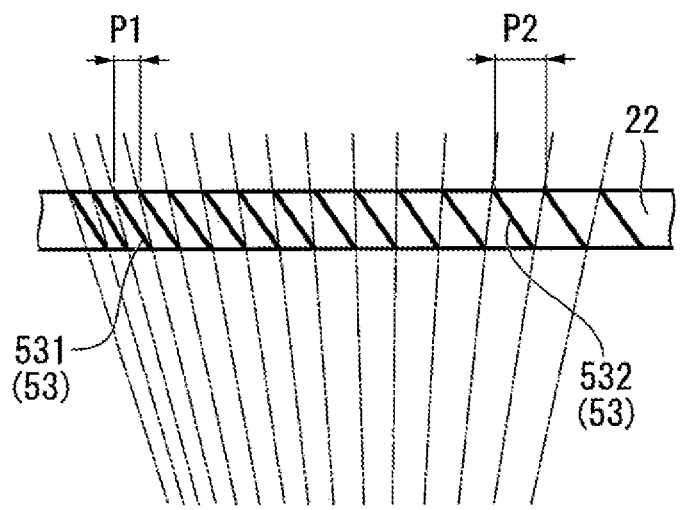
FIG. 14 is a plan view illustrating a plurality of half mirrors in a display device according to Second Exemplary Embodiment.

FIG. 14 is a plan view of a light guiding member of the display device according to the present embodiment.

In FIG. 14, the components common to those of the drawings of First Exemplary Embodiment are denoted with the same reference numerals, and the description thereof is omitted.

Figure 15:
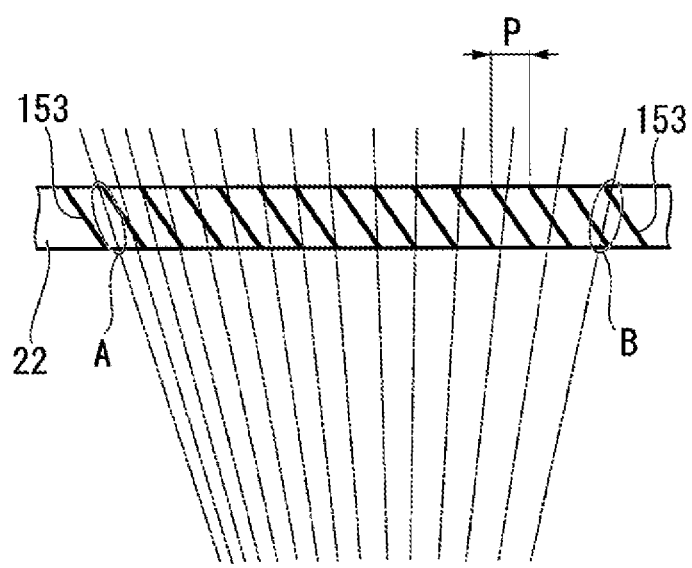
FIG. 15 is a plan view illustrating a plurality of half mirrors in a known display device.

As illustrated in FIG. 15, according to a known display device, the pitch p of the half mirrors 153 adjacent to each other in a plurality of half mirrors 153 is constant regardless of positions of the half mirrors. In this case, in the region indicated with the reference symbol A on the left side in FIG. 15, a blank portion (omission) where image light does not reach the eye is generated as viewed from the viewer. On the other hand, in the region indicated with the reference symbol B on the right side in FIG. 15, the half mirrors 153 adjacent to each other partially overlap with each other as viewed from the viewer, and reflection light of the two half mirrors 153 is superimposed at the overlapping portions, thus resulting in a higher luminance than the portions where half mirrors 153 do not overlap. Such omission (region A) and overlap (region B) of image light lead to increase in contrasted luminance difference, and degrade the image quality with a contrasted streak.

In view of this, in a display device according to the present embodiment, the pitch of the half mirrors 53 adjacent to each other in the plurality of half mirrors 53 differs depending on the locations. Specifically, in the plurality of half mirrors 53, a pitch p1 between a first the half mirror 531 and a half mirror adjacent to the first the half mirror 531 is lower than a pitch p2 between a second half mirror 532, which is located further from the image generation part than the first the half mirror 531, and a half mirror adjacent to the second half mirror 532. In addition, the luminance ratio of emission light from each of the plurality of half mirrors 53 is set to 30% or lower as in First Exemplary Embodiment.

In the display device according to the present embodiment, the luminance ratio of emission light from each half mirror 53 is equal to or lower than 30% and the pitch of the half mirrors 53 adjacent to each other differs depending on the locations, and thus the contrasted streak is less perceived by the eyes of the viewer, and thus the image quality can be improved.

Third Exemplary Embodiment

Third Exemplary Embodiment of the invention is described with reference to FIG. 16 to FIG. 23.

The configuration of a display device according to Third Exemplary Embodiment is substantially the same as the configuration of First Exemplary Embodiment except in that the emitting part is composed of an optical element separated from the light guide. Therefore, the description of the entirety of the display device is omitted, and only different parts are described.

Figure 16:
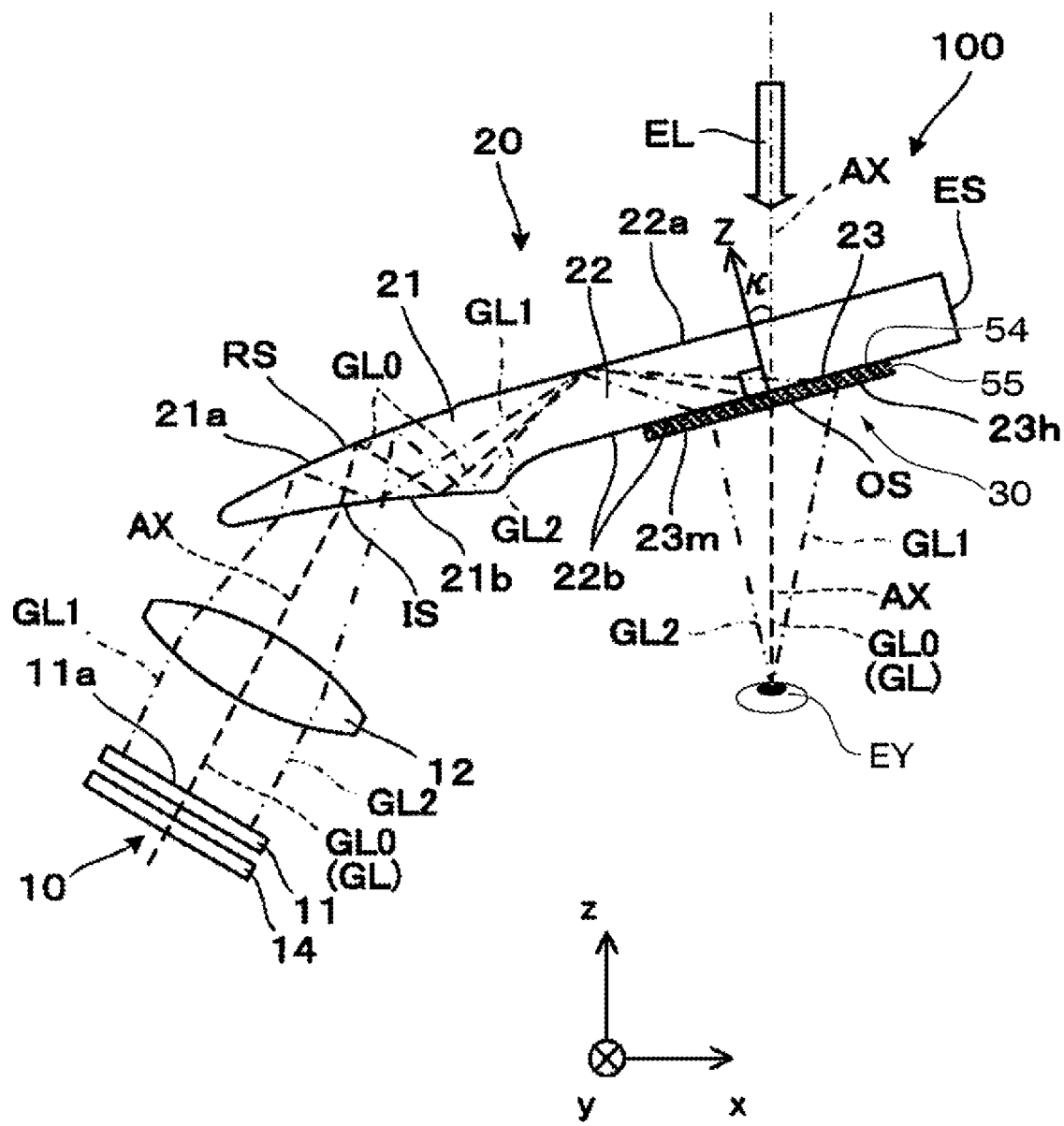
FIG. 16 is a plan view of a display device according to Third Exemplary Embodiment.

FIG. 16 is a plan view of the display device according to the present embodiment.

In FIG. 16, the components common to those of the drawings of First Exemplary Embodiment are denoted with the same reference numerals, and the description thereof is omitted.

As illustrated in FIG. 16, in the display device 100 according to the present embodiment, the emitting part 23 includes an optical element 30 provided on the plane surface 22b on the visually recognized side of the light guide 22. The optical element 30 includes a plurality of half mirrors 54, and a plurality of transmissive members 55. The plurality of half mirrors 54 are provided parallel to one another at an interval, and are configured to reflect a part of the external light EL and the image light GL and cause another part of the external light EL and the image light GL to pass through the plurality of half mirrors 54. Each transmissive member 55 is interposed between two half mirrors 54 adjacent to each other among the plurality of half mirrors 54. That is, the optical element 30 has a configuration in which the half mirror 54 is sandwiched between adjacent two transmissive members 55 in the plurality of transmissive members 55. In other words, the optical element 30 has a configuration in which the half mirror 54 and the transmissive member 55 are alternately disposed.

Figure 17:
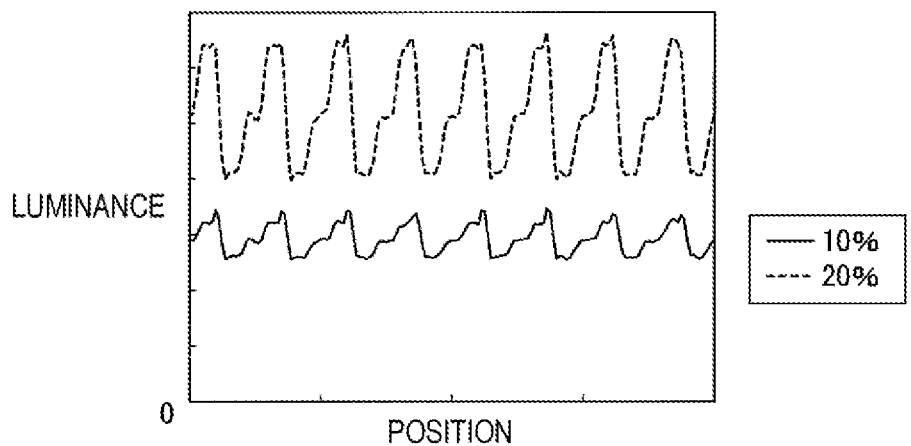
FIG. 17 is a graph illustrating a relationship between the luminance and the position of the half mirror.
Figure 18:
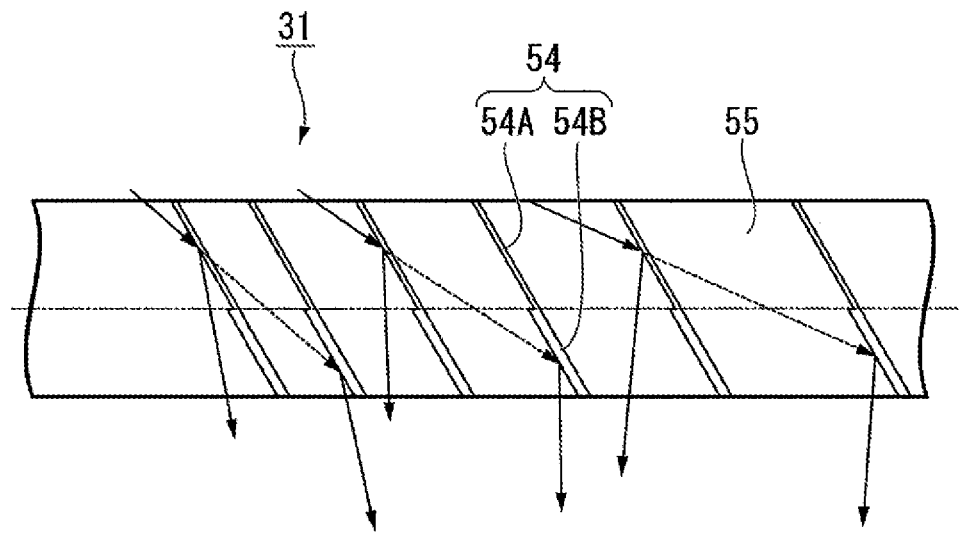
FIG. 18 is a plan view illustrating a plurality of half mirrors in the display device according to Third Exemplary Embodiment.

FIG. 17 illustrates a result of a simulation indicating a relationship between the position of the half mirror 54 and the luminance. In FIG. 17, the abscissa indicates a position in the arrangement direction of the plurality of half mirrors 54 on the light emission surface of the optical element 30. The ordinate indicates the luminance (relative value) on the light emission surface of the optical element 30. The graph of the solid line indicates a case that the reflectance of the half mirrors 54 is set to 10%, and the graph of the broken line indicates a case that the reflectance of the half mirrors 54 is set to 20%. In the simulation, the inclination angle of the half mirrors 54 was set to 60°, and the luminance distribution formed by the light beam at the center angle of view was determined.

As illustrated in FIG. 17, the luminance distribution curve includes a plurality of peaks and valleys, and each peak corresponds to the luminance distribution of one half mirror. It was confirmed that the luminance difference of a case of the reflectance being 10% (the graph of the solid line) is smaller than the luminance difference of a case of the reflectance being 20% (the graph of the broken line). In this manner, it was confirmed that the luminance difference can be reduced by reducing the reflectance of the half mirrors 54.

Further, the reflectance may be varied among locations in one half mirror. For example, as in an optical element 31 illustrated in FIG. 18, the reflectance may be varied in one half mirror 54 between a first region 54A on the far side from the viewer and a second region 54B on the near side from the viewer by varying the film thickness of the reflection film of the half mirror 54.

Figure 19:
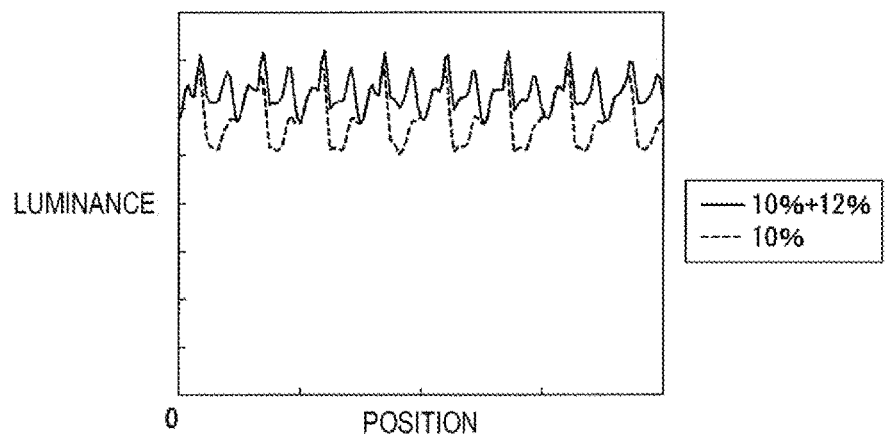
FIG. 19 is a graph illustrating a relationship between the luminance and the position of the half mirrors.

FIG. 19 illustrates a result of a simulation of a relationship between the position of the half mirrors 54 and the luminance in a case where the reflectance is varied in each half mirror 54. In FIG. 19, the abscissa indicates the position in the arrangement direction of the plurality of half mirrors 54 on the light emission surface of the optical element 31. The ordinate indicates the luminance (relative value) on the light emission surface of the optical element 31.

The graph of the solid line illustrates a case that the reflectance of the second region 54B on the near side of the half mirrors 54 from the viewer is set to 12% whereas the reflectance of the first region 54A on the far side of the half mirrors 54 from the viewer is set to 10%, and the graph of the broken line illustrates a case that the reflectance of the entire half mirrors 54 is set to 10%. In the simulation, the inclination angle of the half mirror 54 was set to 60°, and the luminance distribution formed by the light beam at the center angle of view was obtained.

As illustrated in FIG. 19, it was confirmed that the luminance difference of the case that the reflectance is varied among 12% and 10% in each half mirror 54 (the graph of the solid line) is lower than the luminance difference of the case that the reflectance is 10% in its entirety. In this manner, it was confirmed that the luminance difference can be further reduced by varying the reflectance in each half mirror 54.

In addition, also in the present embodiment in which the optical elements 30 and 31 which are provided separately from the light guide 22 are used, a simulation was conducted as in Second Exemplary Embodiment assuming that the optical element has a configuration in which the pitch of the half mirrors adjacent to each other is varied depending on locations.

Figure 20:
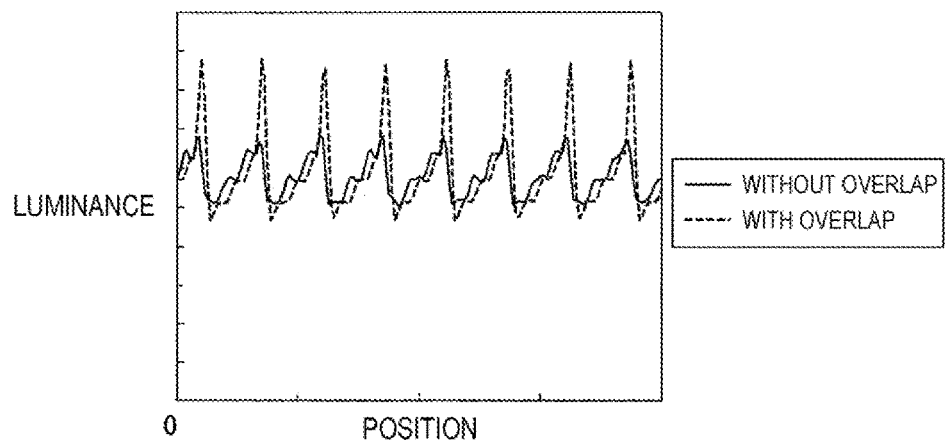
FIG. 20 is a graph illustrating a relationship between the luminance and the position of the half mirrors.

FIG. 20 illustrates a result of a simulation of a relationship between the luminance and the position of half mirrors. In FIG. 20, the abscissa indicates the position in the arrangement direction of a plurality of half mirrors on the light emission surface of the optical element. The ordinate indicates the luminance (relative value) on the light emission surface of the optical element.

The graph of the solid line indicates a case that the pitch of the half mirrors adjacent to each other is varied depending on locations, and the half mirrors adjacent to each other does not overlap with each other, and the graph of the broken line indicates a case that the half mirrors adjacent to each other overlap with each other. In the simulation, the inclination angle of the half mirrors was set to 60°, and the luminance distribution formed by the light beam at the center angle of view was determined.

As illustrated in FIG. 20, it was confirmed that, in the case where the half mirrors adjacent to each other overlap with each other (the graph of the broken line), the reflection light from the half mirrors adjacent to each other is partially superimposed, and consequently each half mirror has a high luminance peak. In contrast, it was confirmed that in the case where the pitch between the half mirrors is adjusted to eliminate the overlap of the half mirrors adjacent to each other (the graph of the solid line), the high luminance peak is eliminated, and the luminance difference can be reduced. Accordingly, it is preferable to optimize the pitch of the half mirrors such that the luminance ratio is reduced in consideration of the position of the pupil of the viewer with respect to the plurality of half mirrors, and the angle component of each angle of view of the image light received by the pupil.

In addition, as another method for eliminating the overlap of the half mirrors adjacent to each other, it is conceivable to reduce the width of the half mirror in the location of the overlap compared to the width of other half mirrors. In other words, it suffices to set the width of at least one half mirror of the plurality of half mirrors to a value different from the width of other half mirrors. To be more specific, the half mirrors adjacent to each other overlap on the far side from the incidence part, and thus it suffices that, of the plurality of half mirrors, the width of the half mirror located on far side from the incidence part is set to smaller than the width of the half mirror located on the near side from the incidence part.

Figure 21:
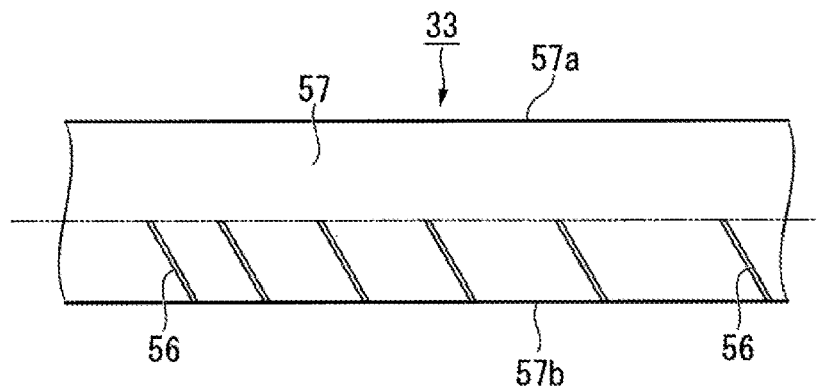
FIG. 21 is a plan view illustrating an exemplary arrangement of a plurality of half mirrors.

In this case, as in the optical element 33 illustrated in FIG. 21, the width of each half mirror 56 may be reduced such that one end of the half mirror 56 reaches a plane surface 57b on the viewer side of a transmissive member 57 and the other end of the half mirror 56 does not reach a plane surface 57a on the external side of the transmissive member 57.

Figure 22:
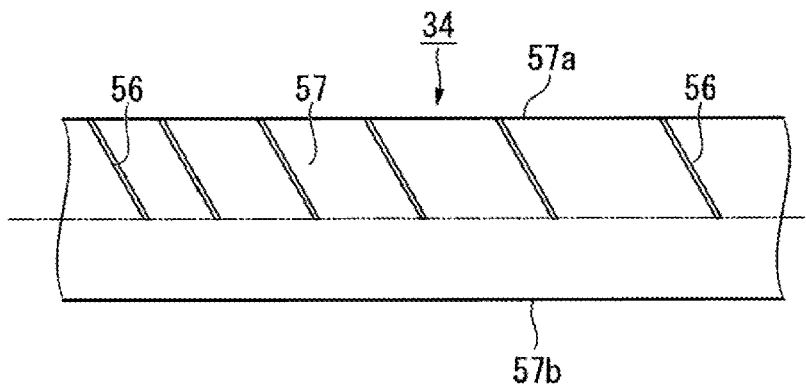
FIG. 22 is a plan view illustrating another exemplary arrangement of a plurality of half mirrors.

Alternatively, as in the optical element 34 illustrated in FIG. 22, the width of each half mirror 56 may be reduced such that one end of the half mirror 56 does not reach the plane surface 57b on the viewer side of the transmissive member 57 and the other end of the half mirror 56 reach the plane surface 57a on the external side of the transmissive member 57.

Here, a simulation was conducted assuming that the optical elements 33 and 34 in which the width of the half mirror 56 is reduced are used.

Figure 23:
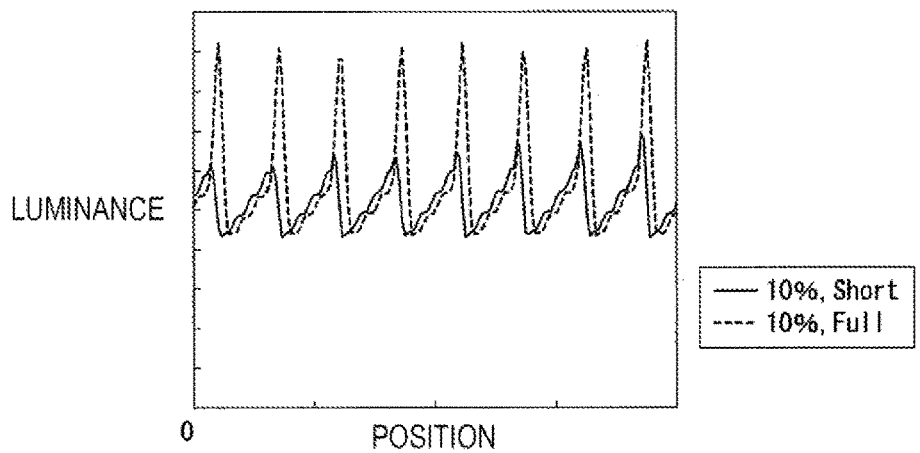
FIG. 23 is a graph illustrating a relationship between the luminance and the position of the half mirrors.

FIG. 23 illustrates a result of a simulation of a relationship between the luminance and the position of the half mirrors 56. In FIG. 23, the abscissa indicates the positions in the arrangement direction of the plurality of half mirrors 56 on the light emission surface of the optical elements 33 and 34. The ordinate indicates the luminance (relative value) on the light emission surface of the optical elements 33 and 34.

The graph of the solid line indicates a case that the width of each half mirror having a reflectance of 10% is reduced to eliminate the overlap of the half mirrors adjacent to each other, and the graph of the broken line indicates a case that the width of each half mirror having a reflectance of 10% is not reduced, and the half mirrors adjacent to each other overlap with each other. In the simulation, the inclination angle of the half mirrors was set to 60°, and the luminance distribution formed by the light beam at the center angle of view was determined.

As illustrated in FIG. 23, it was confirmed that, in the case where the half mirrors adjacent to each other overlap with each other (the graph of the broken line), the reflection light from the half mirrors adjacent to each other is partially superimposed, and consequently each half mirror has a high luminance peak. In contrast, it was confirmed that, in the case where the width of each half mirror is reduced to eliminate the overlap of the half mirrors adjacent to each other (the graph of the solid line), the high luminance peak is eliminated, and thus the luminance difference can be reduced.

Sensory Evaluation 1

The inventors conducted a sensory evaluation with a human eye to compare an image reproduced by a simulation of contrasted streaks due to various luminance ratios and an image of an actually prototyped sample (display device) in which the luminance ratio of the half mirror has a predetermined value.

Here, "contrasted streaks" which are caused by the luminance difference (luminance ratio) in the image surface in a case where a virtual image of an entire white display observed with an angle of view of 50 inches, a virtual image luminance of 1000 nit, and an external light (see-through) luminance of 100 nit is visually recognized by the human pupil was reproduced by a simulation. The value of the luminance ratio was varied among 10% or lower, 30%, 60%, and 90%. It was confirmed that the greater the value of the luminance ratio, the more clearly contrasted streaks are visually recognized in the angle of view, whereas the lower luminance ratio, contrasted streaks are less viewed and the image quality is improved.

On the other hand, an image photograph of a prototyped sample with a luminance ratio of 60% was captured. The image was captured with a special camera simulating the structure of the human pupil. It was confirmed that the image with "contrasted streaks" in the simulation is substantially identical to the photograph of the actual sample, and thus the effectiveness of the simulation was proved.

The results of the sensory evaluation for the simulated images in the various luminance ratios viewed with the human eye were as follows: "very annoying contrasted streak" in a case of a luminance ratio of 90%, "annoying contrasted streak" in a case of a luminance ratio of 60%, "contrasted streak is recognized, but is not annoying" in a case of a luminance ratio of 30%, and "contrasted streak is not recognized" in a case of a luminance ratio of 10% or lower. From the above evaluations, it was confirmed that the luminance ratio in the plane of a half mirror which can provide a high-quality image with no defect of "contrasted streaks" is equal to or lower than 30%, more preferably equal to or lower than 10%.

Note that there is only slight difference in appearance of the contrasted streaks in the sample image photograph and the simulated image, and therefore the difference is difficult to be depicted on patent drawings, and attachment of the corresponding patent drawing is omitted.

Sensory Evaluation 2

The inventors conducted a sensory evaluation with a human eye to confirm the appearance of contrasted streaks in a plurality of actually prototyped samples differing in luminance ratio (display devices of six levels of luminance ratio 10%, 30%, 40%, 50%, 60% and 70%).

The appearance of the contrasted streaks is influenced by three parameters, specifically the angle of view (virtual image size), the virtual image (image) luminance, and the external light luminance. That is, for the human eye, the greater the angle of view, the more clearly the contrasted streaks are viewed; the higher the virtual image luminance, the more clearly the contrasted streaks are viewed; and the lower the external light luminance, the more clearly the contrasted streaks are viewed.

In view of this, in the present sensory evaluation, the angle of view was varied in the range of 10 to 50 inches, the virtual image luminance was varied in the range of 100 to 1000 nit, and the external light luminance was varied in the range of 100 to 20000 nit. The external light luminance was varied among the following six levels: 100 nit: dark indoor, 500 nit: bright indoor, 1000 nit: indoor (high luminance projector), 2000 nit: cloudy outdoor, 3000 nit: white wall in cloudy weather, and 3000 to 20000 nit: outdoor in fine weather. In addition, the angle of view is expressed by a diagonal size of a resolution of 1280×720 and an aspect ratio of 16:9, and corresponds to 10 to 50 inches at a distance of 2.5 m ahead.

The evaluation was conducted based on five levels of the following evaluation points: "5 points: no contrasted streaks are recognized", "4 points: contrasted streaks are recognized but is not annoying", "3 points: contrasted streaks are slightly annoying", "2 points: contrasted streaks are annoying", and "1 point: contrasted streaks are very annoying". Here, the evaluation points may vary depending on evaluating persons, the evaluations were conducted multiple times by multiple evaluating persons of different genders, ages, and the like, and the average point of the evaluations was adopted as the evaluation point.

Figure 24:
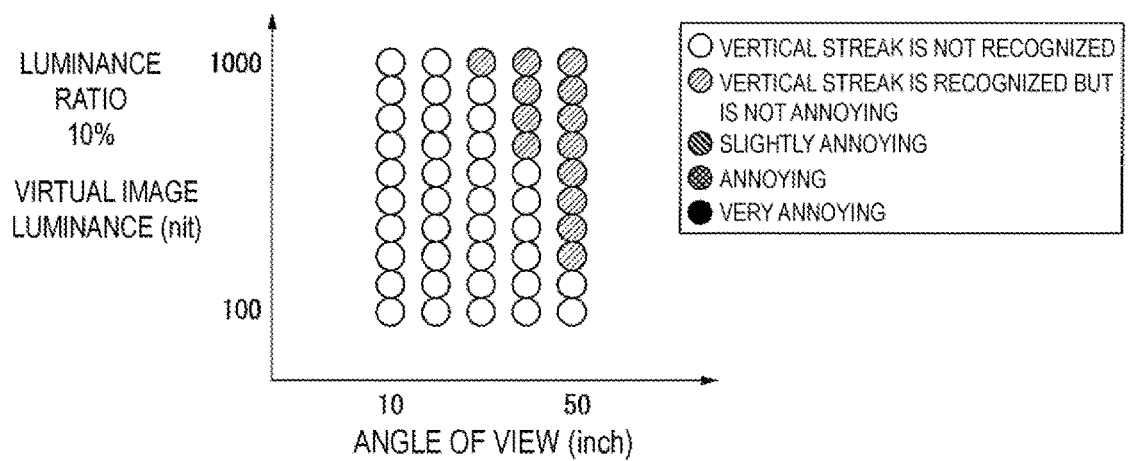
FIG. 24 illustrates sensory evaluation results of a case that the angle of view and the virtual image luminance are varied (luminance ratio: 10%).
Figure 25:
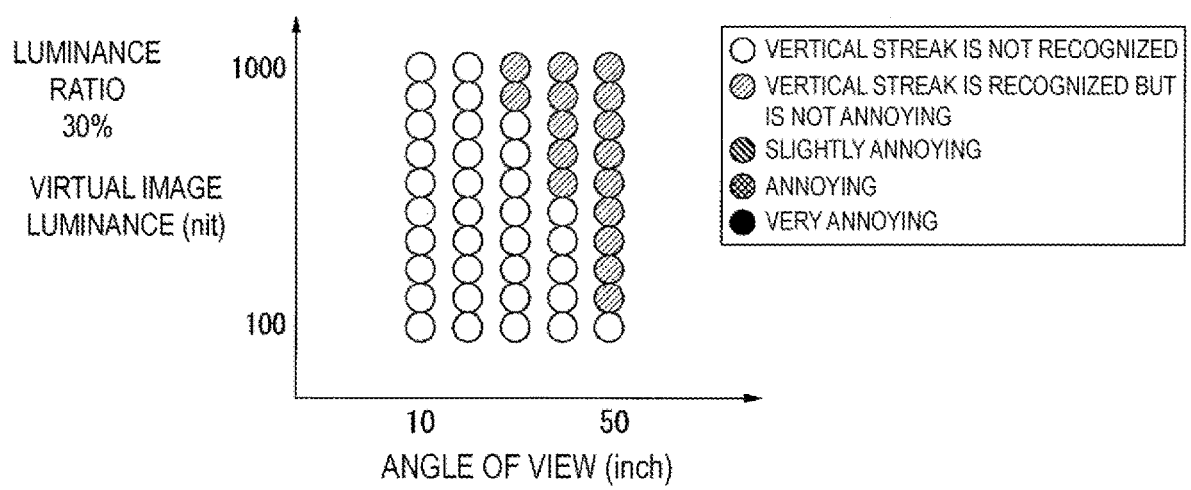
FIG. 25 illustrates sensory evaluation results of a case that the angle of view and the virtual image luminance are varied (luminance ratio: 30%).
Figure 26:
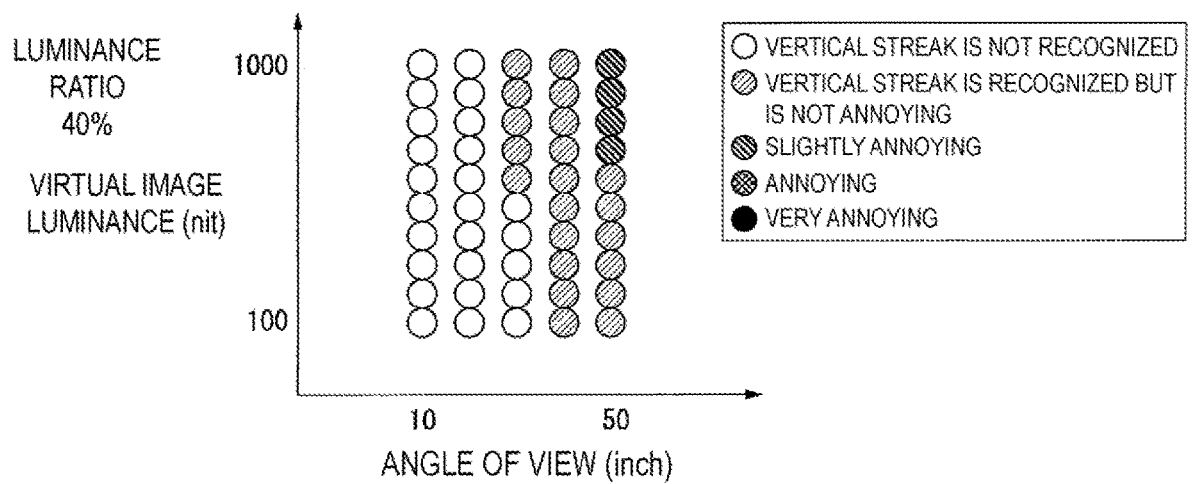
FIG. 26 illustrates sensory evaluation results of a case that the angle of view and the virtual image luminance are varied (luminance ratio: 40%).
Figure 27:
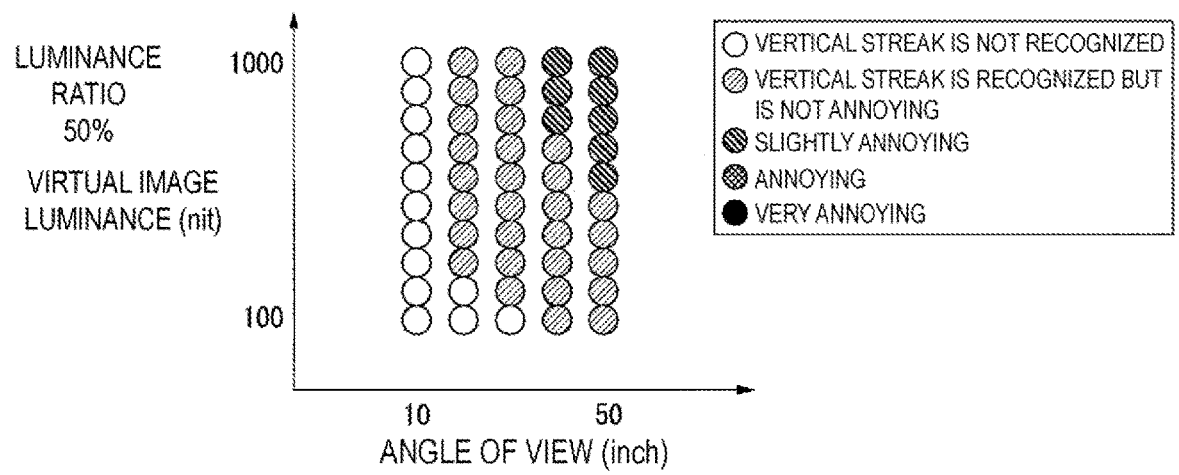
FIG. 27 illustrates sensory evaluation results of a case that the angle of view and the virtual image luminance are varied (luminance ratio: 50%).
Figure 28:
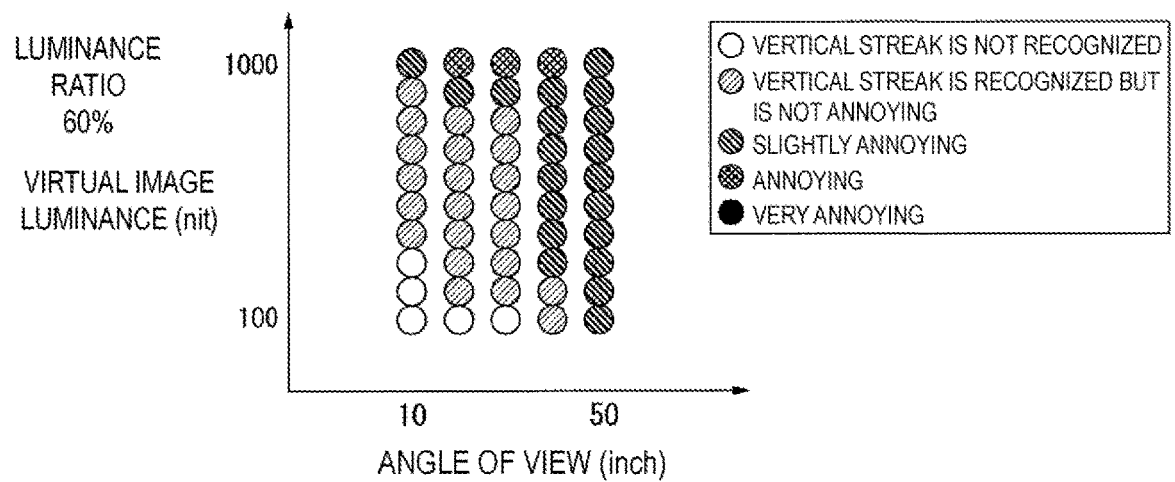
FIG. 28 illustrates sensory evaluation results of a case that the angle of view and the virtual image luminance are varied (luminance ratio: 60%).
Figure 29:
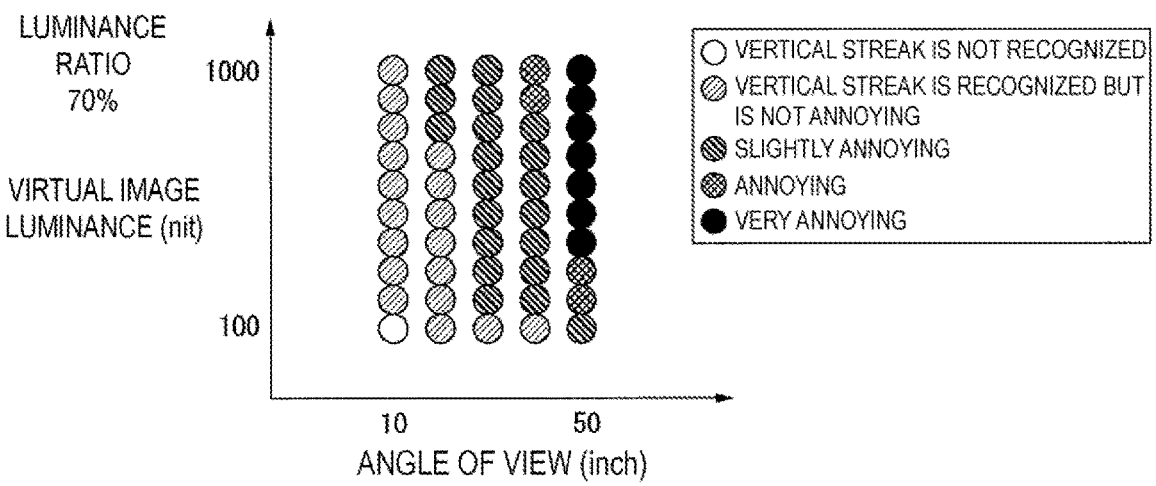
FIG. 29 illustrates sensory evaluation results of a case that the angle of view and the virtual image luminance are varied (luminance ratio: 70%).

FIG. 24 to FIG. 29 are drawings illustrating sensory evaluation results of a case that the angle of view and the virtual image luminance are varied among the above-mentioned three parameters, FIG. 24 illustrates a case that the luminance ratio is 10%, FIG. 25 illustrates a case that the luminance ratio is 30%, FIG. 26 illustrates a case that the luminance ratio is 40%, FIG. 27 illustrates a case that the luminance ratio is 50%, FIG. 28 illustrates a case that the luminance ratio is 60%, and FIG. 29 illustrates a case that the luminance ratio is 70%. Here, the remaining parameter, the external light luminance, was set to a constant value 100 nit in each case.

As illustrated in FIG. 24 to FIG. 29, under a condition that the contrasted streaks are most clearly viewed with an angle of view of 50 inches and a virtual image luminance of 1000 nit, "5 points" is not obtained with any of the luminance ratios. As illustrated in FIG. 24, to obtain "5 points", the angle of view needs to be equal to or smaller than 20 inches, or the virtual image luminance needs to be equal to or lower than 200 nit even in the case where the luminance ratio is 10%.

As illustrated in FIG. 26 to FIG. 29, in a case where the luminance ratio is equal to or higher than 40%, the evaluation point is "3 points" or lower in some cases due to the angle of view or the virtual image luminance. In contrast, as illustrated in FIG. 24 and FIG. 25, in a case where the luminance ratio is equal to or lower than 30%, the evaluation point is "4 points" or higher in all conditions of the angle of view and the virtual image luminance.

Figure 30:
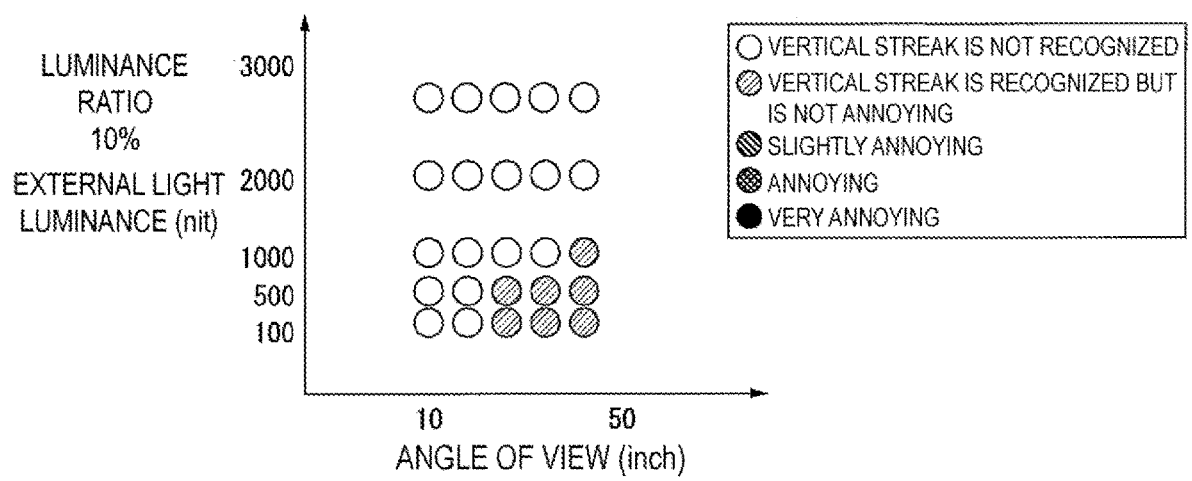
FIG. 30 illustrates sensory evaluation results of a case that the angle of view and the external light luminance are varied (luminance ratio: 10%).
Figure 31:
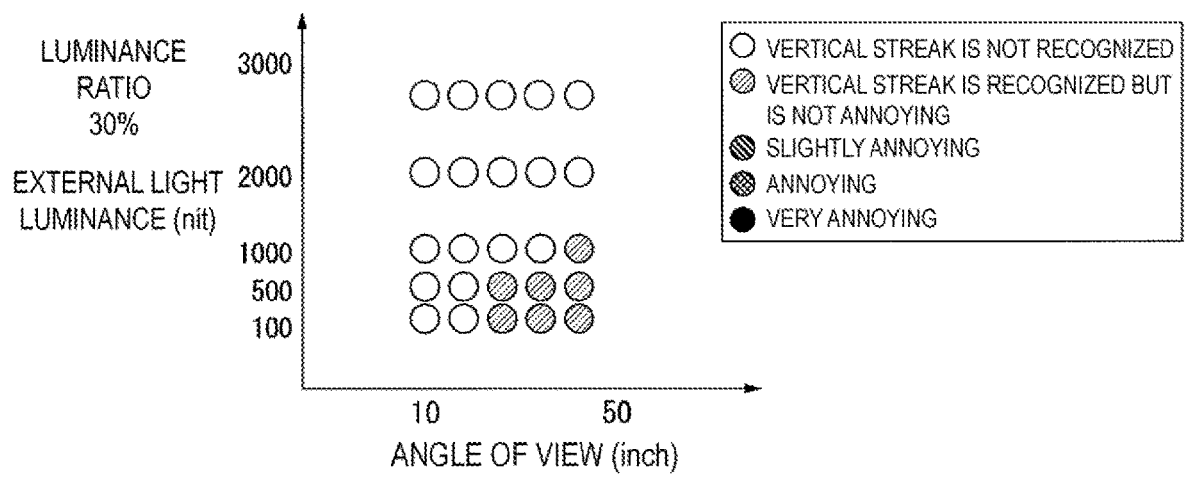
FIG. 31 illustrates sensory evaluation results of a case that the angle of view and the external light luminance are varied (luminance ratio: 30%).
Figure 32:
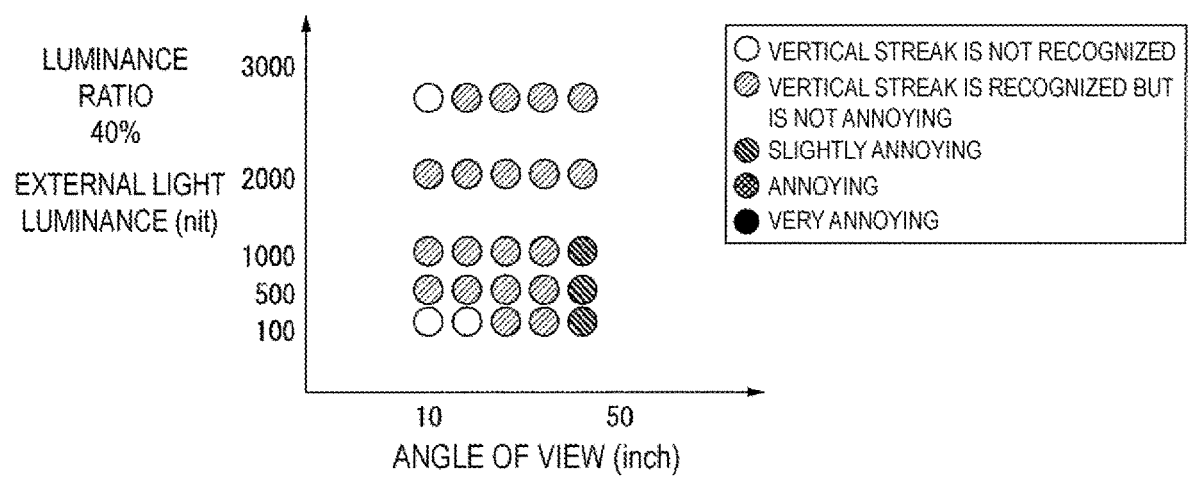
FIG. 32 illustrates sensory evaluation results of a case that the angle of view and the external light luminance are varied (luminance ratio: 40%).
Figure 33:
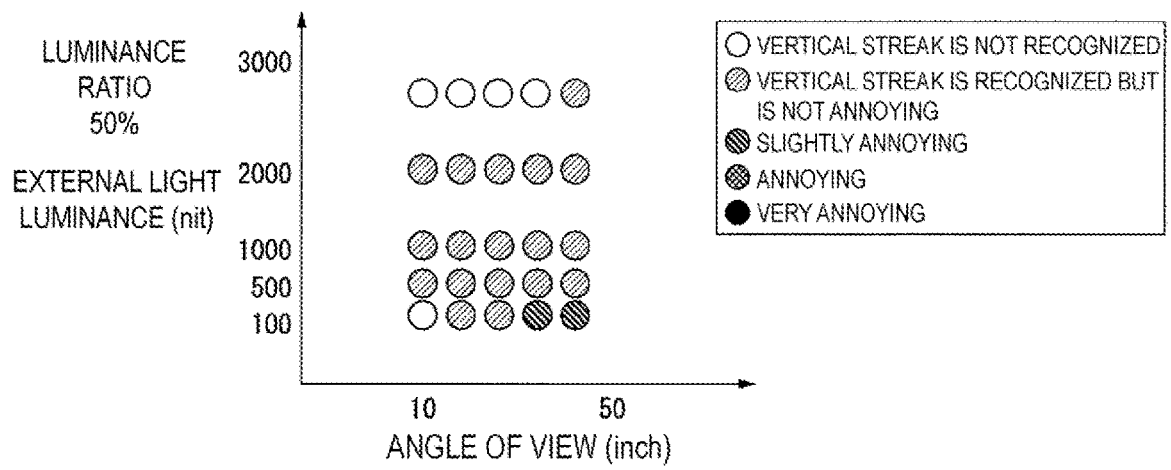
FIG. 33 illustrates sensory evaluation results of a case that the angle of view and the external light luminance are varied (luminance ratio: 50%).
Figure 34:
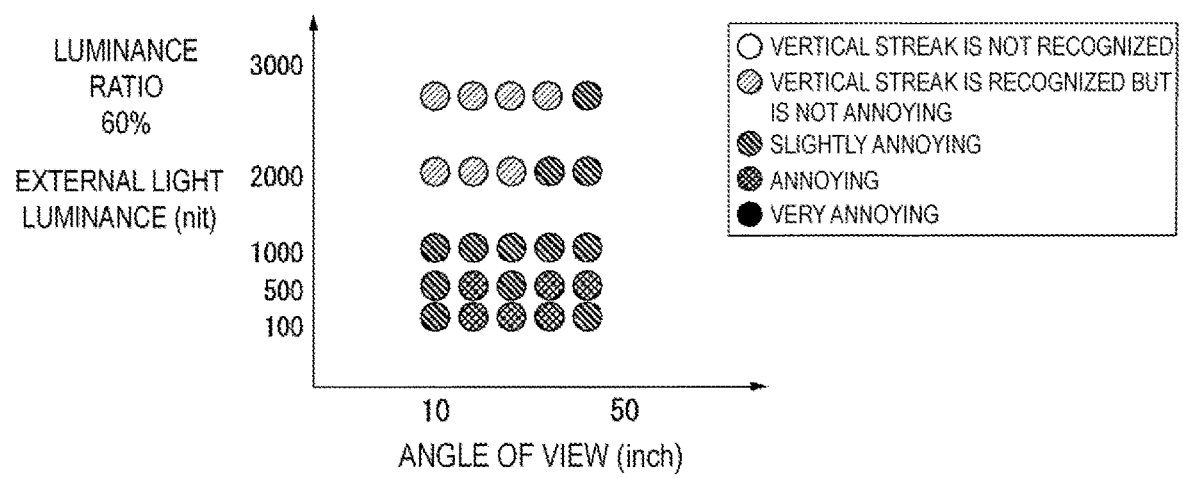
FIG. 34 illustrates sensory evaluation results of a case that the angle of view and the external light luminance are varied (luminance ratio: 60%).
Figure 35:
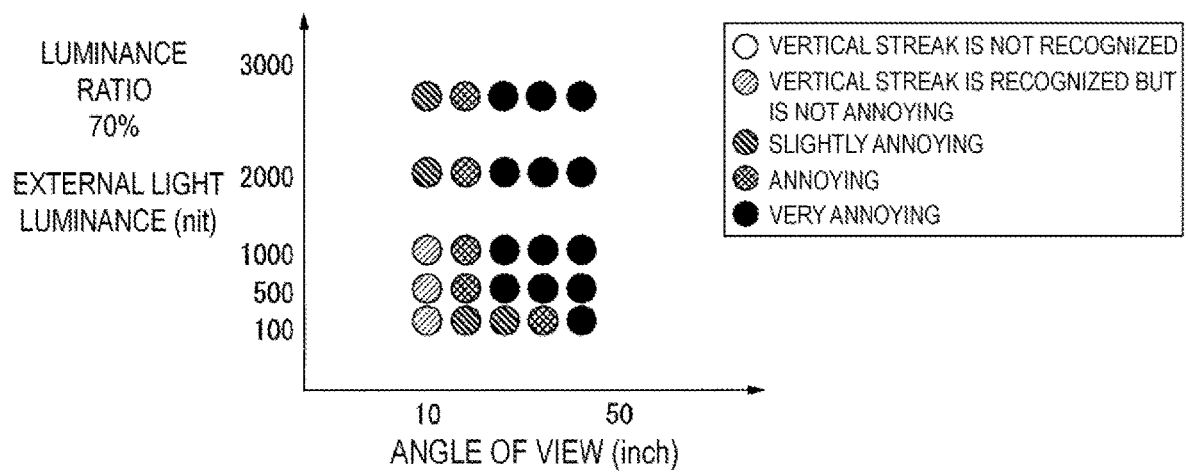
FIG. 35 illustrates sensory evaluation results of a case that the angle of view and the external light luminance are varied (luminance ratio: 70%).

Next, FIG. 30 to FIG. 35 are drawings illustrating sensory evaluation results of a case that the angle of view and the external light luminance are varied among the above-mentioned three parameters, FIG. 30 illustrates a case that the luminance ratio is 10%, FIG. 31 illustrates a case that the luminance ratio is 30%, FIG. 32 illustrates a case that the luminance ratio is 40%, FIG. 33 illustrates a case that the luminance ratio is 50%, FIG. 34 illustrates a case that the luminance ratio is 60%, and FIG. 35 illustrates a case that the luminance ratio is 70%. Here, the remaining parameter, the virtual image luminance, was set to a constant value 1000 nit in each case.

As illustrated in FIG. 32 to FIG. 35, in a case where the luminance ratio is equal to or higher than 40%, the evaluation point is "3 points" or lower in some cases due to the angle of view or the virtual image luminance. In contrast, as illustrated in FIG. 30 and FIG. 31, in a case where the luminance ratio is equal to or lower than 30%, the evaluation point is "4 points" or higher in all conditions of the angle of view and the virtual image luminance. In particular, in a case where the luminance ratio is equal to or lower than 30% and the external light luminance is equal to or higher than 2000 nit, the evaluation point "5 points" is obtained regardless of the angle of view, and no contrasted streaks are recognized. In a case where the external light luminance is equal to or lower than 1000 nit (indoor environment level), the evaluation point "4 points" is obtained with a large angle of view, and then, contrasted streaks are recognized but is not annoying.

Figure 36:
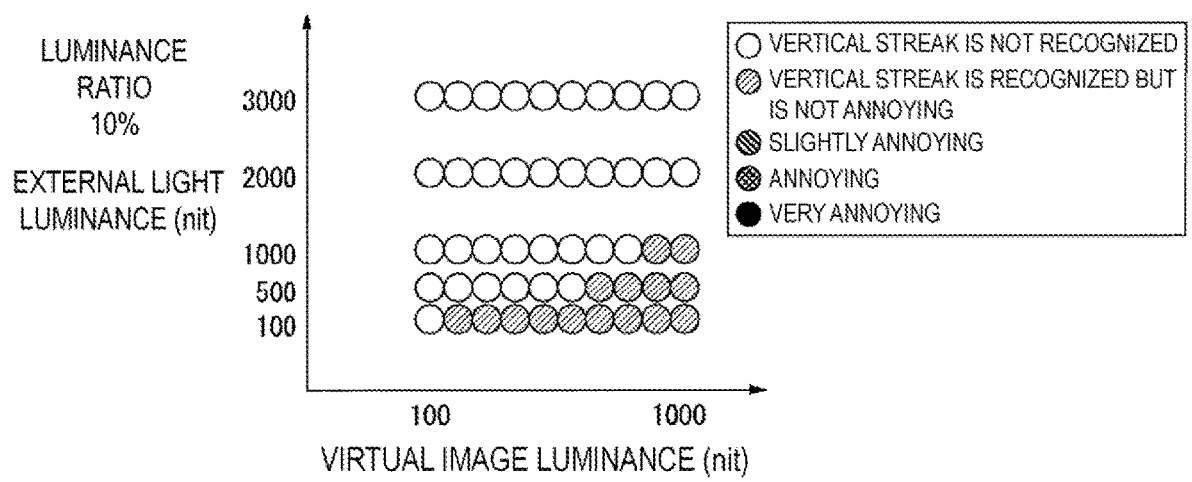
FIG. 36 illustrates sensory evaluation results of a case that the virtual image luminance and the external light luminance are varied (luminance ratio: 10%).
Figure 37:
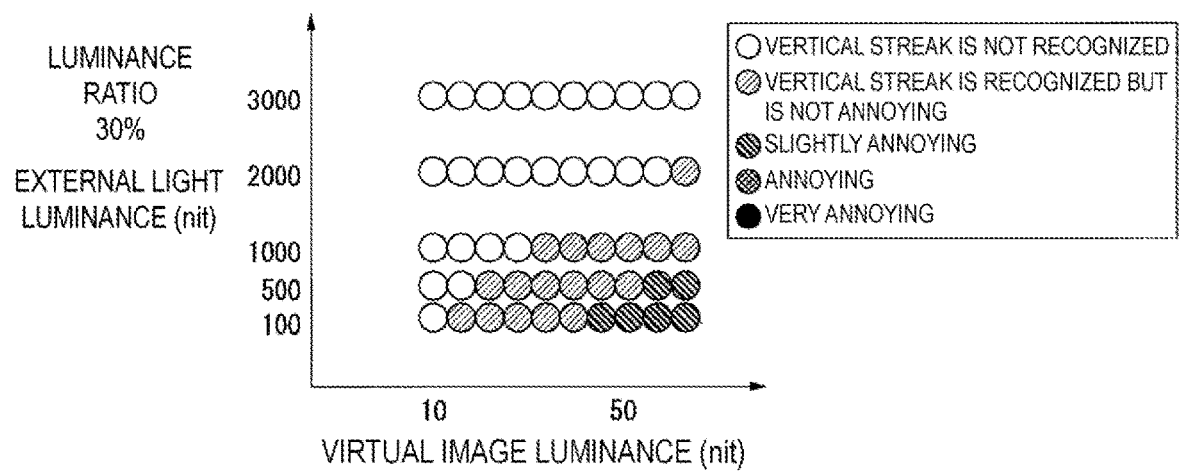
FIG. 37 illustrates sensory evaluation results of a case that the virtual image luminance and the external light luminance are varied (luminance ratio: 30%).
Figure 38:
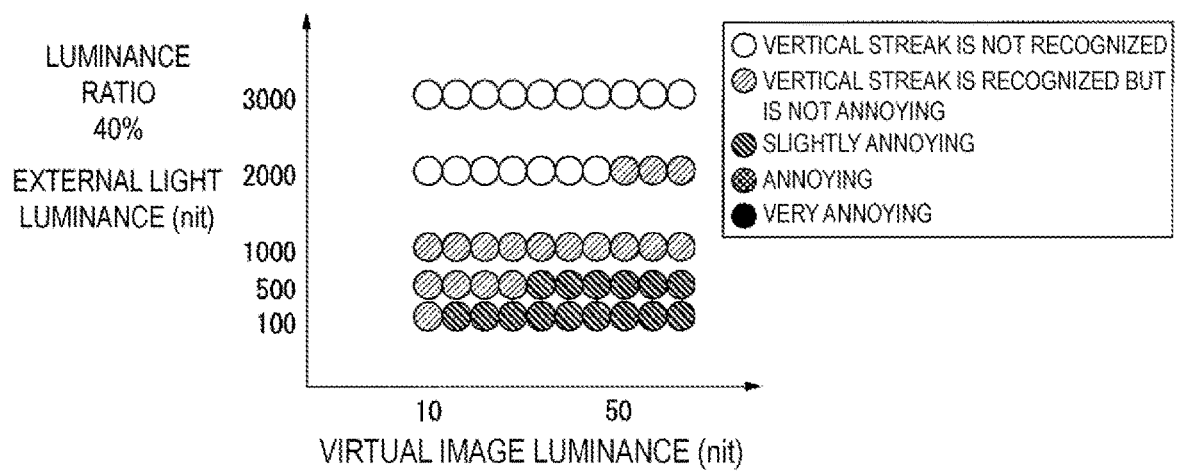
FIG. 38 illustrates sensory evaluation results of a case that the virtual image luminance and the external light luminance are varied (luminance ratio: 40%).
Figure 39:
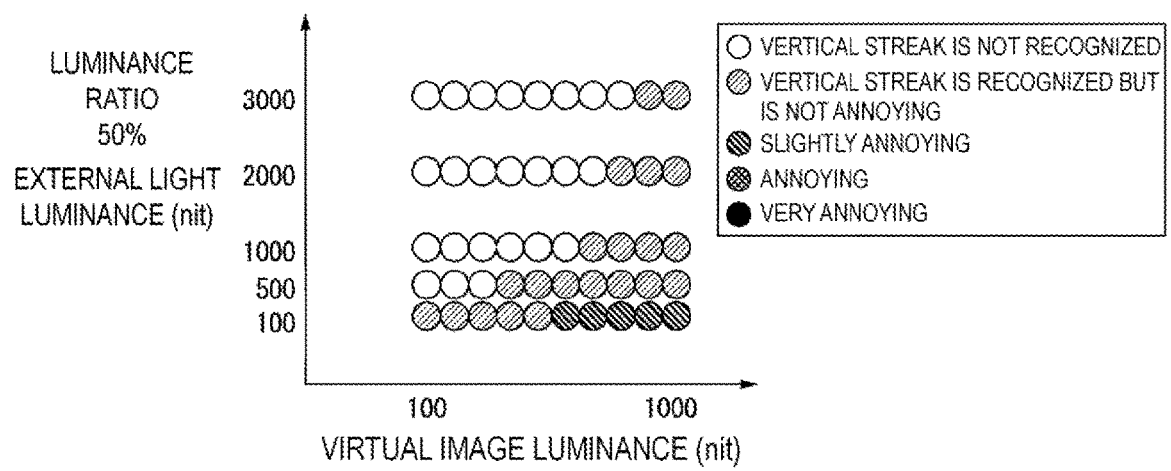
FIG. 39 illustrates sensory evaluation results of a case that the virtual image luminance and the external light luminance are varied (luminance ratio: 50%).
Figure 40:
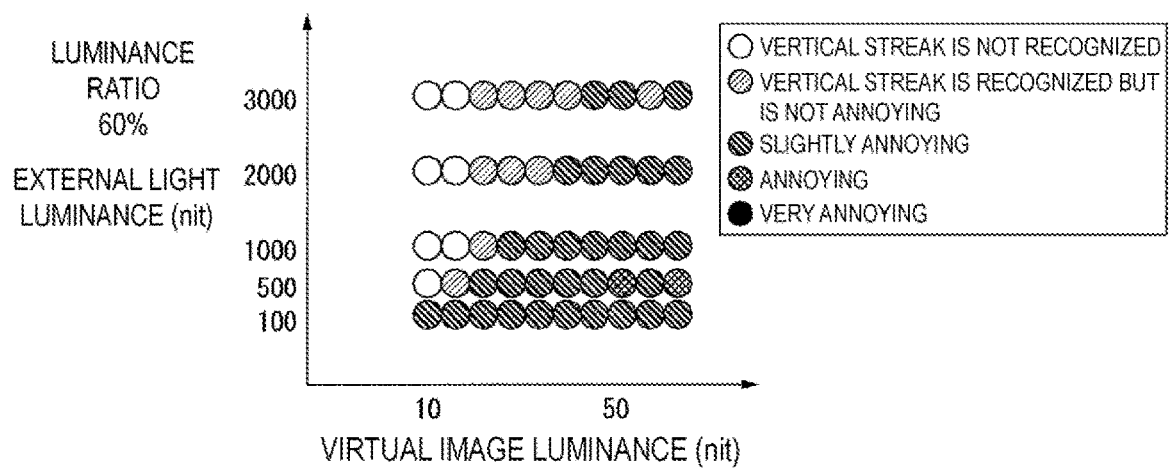
FIG. 40 illustrates sensory evaluation results of a case that the virtual image luminance and the external light luminance are varied (luminance ratio: 60%).
Figure 41:
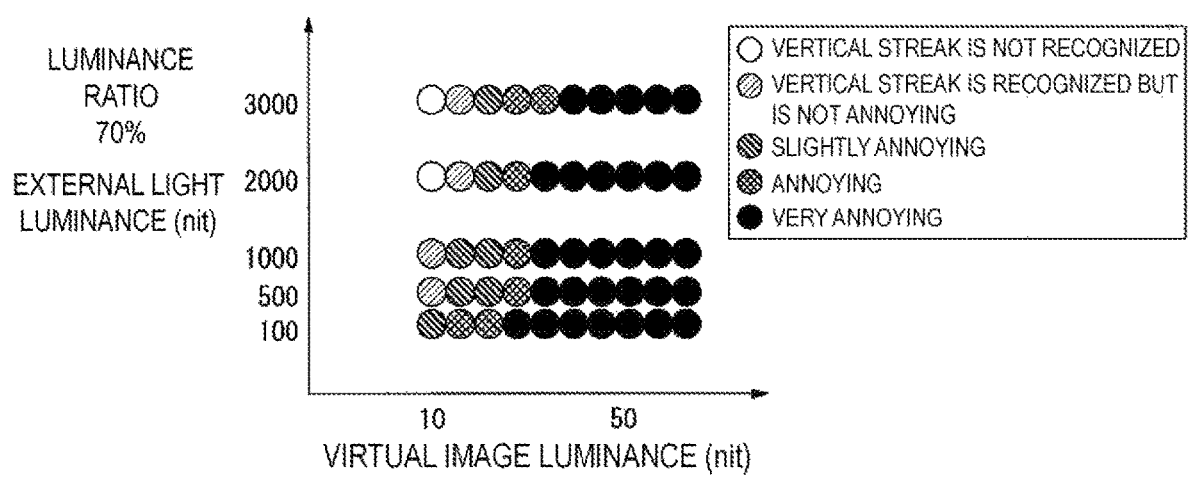
FIG. 41 illustrates sensory evaluation results of a case that the virtual image luminance and the external light luminance are varied (luminance ratio: 70%).

Next, FIG. 36 to FIG. 41 are drawings illustrating sensory evaluation results of a case that the virtual image luminance and the external light luminance of the above-mentioned three parameters are varied, FIG. 36 illustrates a case that the luminance ratio is 10%, FIG. 37 illustrates a case that the luminance ratio is 30%, FIG. 38 illustrates a case that the luminance ratio is 40%, FIG. 39 illustrates a case that the luminance ratio is 50%, FIG. 40 illustrates a case that the luminance ratio is 60%, and FIG. 41 illustrates a case that the luminance ratio is 70%. Here, the remaining parameter, the angle of view, was set to a constant value 50 inches in each case.

As illustrated in FIG. 36 and FIG. 37, in a case where the luminance ratio is equal to or lower than 30%, the evaluation point "5 points" is obtained when the virtual image luminance is 100 nit regardless of the external light luminance. Even in a case where the virtual image luminance is higher than 100 nit, the evaluation point "4 points" or greater is obtained under most of conditions. In contrast, in a case where the luminance ratio is equal to or higher than 40%, the number of conditions under which the evaluation point of "4 points" or higher is obtained decreases as illustrated in FIG. 38 and FIG. 39, and in a case where the luminance ratio is 60% or higher, the number of conditions under which only the evaluation point of "3 points" or lower is obtained notably increases as illustrated in FIG. 40 and FIG. 41.

From the above-mentioned sensory evaluation results, it was confirmed that contrasted streaks due to the in-plane luminance difference in the half mirror can be reduced to a degree that is hardly recognized by the viewer by suppressing the luminance ratio of the half mirror to 30% or lower regardless of values of the three parameters, specifically, the angle of view, the virtual image luminance, and the external light luminance.

Note that the technical scope of the invention is not limited to the above-described exemplary embodiments, and various modifications can be made to the above-described exemplary embodiments without departing from the spirit and gist of the invention.

For example, while the above-mentioned embodiments describe examples in which the luminance ratio of all half mirrors are set to 30% or lower, the luminance ratios may be set to 30% or lower only in some of a plurality of half mirrors. Even with such a configuration, contrasted streaks can be made less visible to a certain degree.

Furthermore, the specific configuration of the display device such as the number, arrangement, shape, material and the like of the components of the display device is not limited to the above-mentioned embodiments, and may be appropriately changed.

The entire disclosure of Japanese Patent Application No. 2018-001024, filed Jan. 9, 2018 is expressly incorporated by reference herein

What is claimed is:

1. A display device comprising:
an image generation part configured to generate image light;
a light guide including a first surface and a second surface opposite to each other, the light guide being configured to guide the image light;
an incidence part configured to cause the image light to enter the light guide from the image generation part; and
an emitting part configured to cause the image light to emit from the light guide toward an exit pupil, the emitting part including a plurality of half mirrors which are disposed parallel to one another at an interval, each of the plurality of half mirrors being tilted to the first surface and the second surface and configured to reflect a part of the image light and cause another part of the image light to pass through the half mirror,
wherein in at least one half mirror of the plurality of half mirrors, when Bmax represents a maximum luminance, Bmin represents a minimum luminance, and a non-zero luminance ratio R(%) is defined as R=[(Bmax−Bmin)/Bmax]×100, R≤30 is satisfied.

2. The display device according to claim 1, wherein the at least one half mirror includes a reflectance equal to or lower than 30% at an incident angle at which the image light is selectively reflected, and a transmittance higher than 70% at an incident angle at which the image light is selectively allowed to pass through the at least one half mirror.

3. The display device according to claim 1, wherein the non-zero luminance ratio R(%) is R≤10.

4. The display device according to claim 3, wherein the at least one half mirror includes a reflectance equal to or lower than 10% at an incident angle at which the image light is selectively reflected, and a transmittance higher than 90% at an incident angle at which the image light is selectively allowed to pass through the at least one half mirror.

5. The display device according to claim 1, wherein each of the plurality of half mirrors is composed of a dielectric multi-layer film.

6. The display device according to claim 5, wherein a metal film is provided inside the dielectric multi-layer film.

7. The display device according to claim 1, wherein, of the plurality of half mirrors, a pitch between a first half mirror and a half mirror adjacent to the first half mirror is smaller than a pitch between a second half mirror and a half mirror adjacent to the second half mirror, the second half mirror being located on a side further from the image generation part than the first half mirror.

8. The display device according to claim 1, wherein, at least one half mirror of the plurality of half mirrors has a width different from a width of another half mirror.

9. The display device according to claim 1, wherein at least one half mirror of the plurality of half mirrors includes a first region and a second region with film thickness different from a film thickness of the first region.

10. A display device comprising:
an image generation part configured to generate image light;

a light guide including a first surface and a second surface opposite to each other, the light guide being configured to guide the image light;

an incidence part configured to cause the image light to enter the light guide from the image generation part; and an emitting part configured to cause the image light to emit from the light guide toward an exit pupil, the emitting part including a plurality of half mirrors which are disposed parallel to one another at an interval, each of the plurality of half mirrors being tilted to the first surface and the second surface and configured to reflect a part of the image light and cause another part of the image light to pass through the half mirror, wherein in at least one half mirror of the plurality of half mirrors, when Bmax represents a maximum luminance, Bmin represents a minimum luminance, and a luminance ratio R(%) is defined as R=[(Bmax−Bmin)/Bmax]×100, R≤10 is satisfied, the at least one half mirror includes a reflectance equal to or lower than 10% at an incident angle at which the image light is selectively reflected, and a transmittance higher than 90% at an incident angle at which the image light is selectively allowed to pass through the at least one half mirror.

11. A display device comprising:
an image generation part configured to generate image light;
a light guide including a first surface and a second surface opposite to each other, the light guide being configured to guide the image light;
an incidence part configured to cause the image light to enter the light guide from the image generation part; and
an emitting part configured to cause the image light to emit from the light guide toward an exit pupil, the emitting part including a plurality of half mirrors which are disposed parallel to one another at an interval, each of the plurality of half mirrors being tilted to the first surface and the second surface and configured to reflect a part of the image light and cause another part of the image light to pass through the half mirror,
wherein in at least one half mirror of the plurality of half mirrors, when Bmax represents a maximum luminance, Bmin represents a minimum luminance, and a luminance ratio R(%) is defined as R=[(Bmax−Bmin)/Bmax]×100, R≤30 is satisfied, and of the plurality of half mirrors, a pitch between a first half mirror and a half mirror adjacent to the first half mirror is smaller than a pitch between a second half mirror and a half mirror adjacent to the second half mirror, the second half mirror being located on a side further from the image generation part than the first half mirror.

12. A display device comprising:
an image generation part configured to generate image light;
a light guide including a first surface and a second surface opposite to each other, the light guide being configured to guide the image light;
an incidence part configured to cause the image light to enter the light guide from the image generation part; and
an emitting part configured to cause the image light to emit from the light guide toward an exit pupil, the emitting part including a plurality of half mirrors which are disposed parallel to one another at an interval, each of the plurality of half mirrors being tilted to the first surface and the second surface and configured to reflect a part of the image light and cause another part of the image light to pass through the half mirror,
wherein in at least one half mirror of the plurality of half mirrors, when Bmax represents a maximum luminance, Bmin represents a minimum luminance, and a luminance ratio R(%) is defined as R=[(Bmax−Bmin)/Bmax]×100, R≤30 is satisfied, and at least one half mirror of the plurality of half mirrors has a width different from a width of another half mirror.

13. A display device comprising:
an image generation part configured to generate image light;
a light guide including a first surface and a second surface opposite to each other, the light guide being configured to guide the image light;
an incidence part configured to cause the image light to enter the light guide from the image generation part; and
an emitting part configured to cause the image light to emit from the light guide toward an exit pupil, the emitting part including a plurality of half mirrors which are disposed parallel to one another at an interval, each of the plurality of half mirrors being tilted to the first surface and the second surface and configured to reflect a part of the image light and cause another part of the image light to pass through the half mirror,
wherein in at least one half mirror of the plurality of half mirrors, when Bmax represents a maximum luminance, Bmin represents a minimum luminance, and a luminance ratio R(%) is defined as R=[(Bmax−Bmin)/Bmax]×100, R≤30 is satisfied, and at least one half mirror of the plurality of half mirrors includes a first region and a second region with film thickness different from a film thickness of the first region.

* * * * *